United States Patent
Tran et al.

(10) Patent No.: US 9,578,336 B2
(45) Date of Patent: Feb. 21, 2017

(54) HYBRID VIDEO AND GRAPHICS SYSTEM WITH AUTOMATIC CONTENT DETECTION PROCESS, AND OTHER CIRCUITS, PROCESSES, AND SYSTEMS

(75) Inventors: Thanh Thien Tran, Houston, TX (US); Jonathan Edward Hunter, Stafford, TX (US); Sriram Narayanan, Richardson, TX (US); Jian Wang, Stafford, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1292 days.

(21) Appl. No.: 13/490,639

(22) Filed: Jun. 7, 2012

(65) Prior Publication Data

US 2013/0050254 A1    Feb. 28, 2013

Related U.S. Application Data

(60) Provisional application No. 61/529,526, filed on Aug. 31, 2011.

(51) Int. Cl.
*H04N 19/139* (2014.01)
*H04N 19/103* (2014.01)
(Continued)

(52) U.S. Cl.
CPC .............. *H04N 19/139* (2014.11); *G06F 3/14* (2013.01); *H04N 19/103* (2014.11); *H04N 19/27* (2014.11);
(Continued)

(58) Field of Classification Search
CPC .......................... H04N 19/00; H04N 19/00903
(Continued)

(56) References Cited

U.S. PATENT DOCUMENTS

| 7,272,180 B2 | 9/2007 | Dambrackas |
| 7,932,843 B2 | 4/2011 | Demircin et al. |

(Continued)

OTHER PUBLICATIONS

Said, A. Compression of compound images and video for enabling rich media in embedded systems. Visual Communications and Image Processing 2004, Eds. : Panchanathan, S. et al. Proc. of SPIE-IS&T Electronic Imaging, SPIE vol. 5308, 14 pp.: 69-82. Figs. 1-2.

(Continued)

*Primary Examiner* — Edward Martello
(74) *Attorney, Agent, or Firm* — Robert D. Marshall, Jr.; Charles A. Brill; Frank D. Cimino

(57) ABSTRACT

A computing device (300) includes a storage (325) that over time is operable to include video and graphics content and the storage has a first set of instructions representing lossy video compression (130) and a second set of instructions representing lossless compression (120); and a processor (320) coupled with said storage (325), and said processor (320) operable to electronically analyze (110) at least a portion of the content for motion based on magnitudes of motion vectors and, on detection of a significant amount of motion, further operable to activate the first set of instructions (130) to compress at least the motion video, and otherwise to activate the second set of instructions representing lossless compression (120) to compress at least the graphics. Other devices, systems, and processes are disclosed.

20 Claims, 15 Drawing Sheets

(51) Int. Cl.
  *H04N 19/27* (2014.01)
  *G06F 3/14* (2006.01)
(52) U.S. Cl.
  CPC ..... *G06F 3/1454* (2013.01); *G09G 2320/0613* (2013.01); *G09G 2320/106* (2013.01); *G09G 2340/02* (2013.01); *G09G 2350/00* (2013.01); *G09G 2360/10* (2013.01); *G09G 2370/022* (2013.01); *G09G 2370/24* (2013.01)
(58) Field of Classification Search
  USPC .......................................... 345/546; 382/236
  See application file for complete search history.

(56) References Cited

U.S. PATENT DOCUMENTS

| | | | |
|---|---|---|---|
| 8,442,311 | B1 * | 5/2013 | Hobbs et al. ................. 382/166 |
| 2001/0024239 | A1 * | 9/2001 | Feder et al. ............... 348/423.1 |
| 2004/0001548 | A1 * | 1/2004 | McIntyre ................ G06T 9/007 375/240.16 |
| 2005/0226524 | A1 | 10/2005 | Komiya et al. |
| 2008/0063054 | A1 | 3/2008 | Ratakonda et al. |
| 2009/0154819 | A1 | 6/2009 | Doherty et al. |
| 2009/0183059 | A1 | 7/2009 | Gupte et al. |
| 2009/0231474 | A1 * | 9/2009 | Ludwig ........................ 348/252 |
| 2009/0282064 | A1 | 11/2009 | Raju et al. |
| 2010/0135397 | A1 | 6/2010 | Tanaka |
| 2010/0142931 | A1 | 6/2010 | Tran et al. |
| 2010/0228884 | A1 | 9/2010 | Sim et al. |
| 2010/0246985 | A1 | 9/2010 | Karaoguz et al. |
| 2010/0290533 | A1 | 11/2010 | Minagawa |
| 2010/0316126 | A1 | 12/2010 | Chen et al. |
| 2011/0078532 | A1 | 3/2011 | Vonog et al. |
| 2011/0080947 | A1 | 4/2011 | Chen et al. |
| 2011/0080956 | A1 | 4/2011 | Zhou et al. |
| 2011/0115800 | A1 | 5/2011 | Desai |
| 2011/0145879 | A1 * | 6/2011 | Rajamani et al. ............ 725/116 |
| 2011/0188836 | A1 | 8/2011 | Popkiewicz et al. |
| 2011/0216834 | A1 | 9/2011 | Zhou |
| 2011/0280314 | A1 | 11/2011 | Sankaran et al. |

OTHER PUBLICATIONS

Peng, C. et al. HD Video Encoding with DSP and FPGA Partitioning. White Paper SPRY103, Texas Instruments 2007, 9pp. Figs. 1-5b.

* cited by examiner

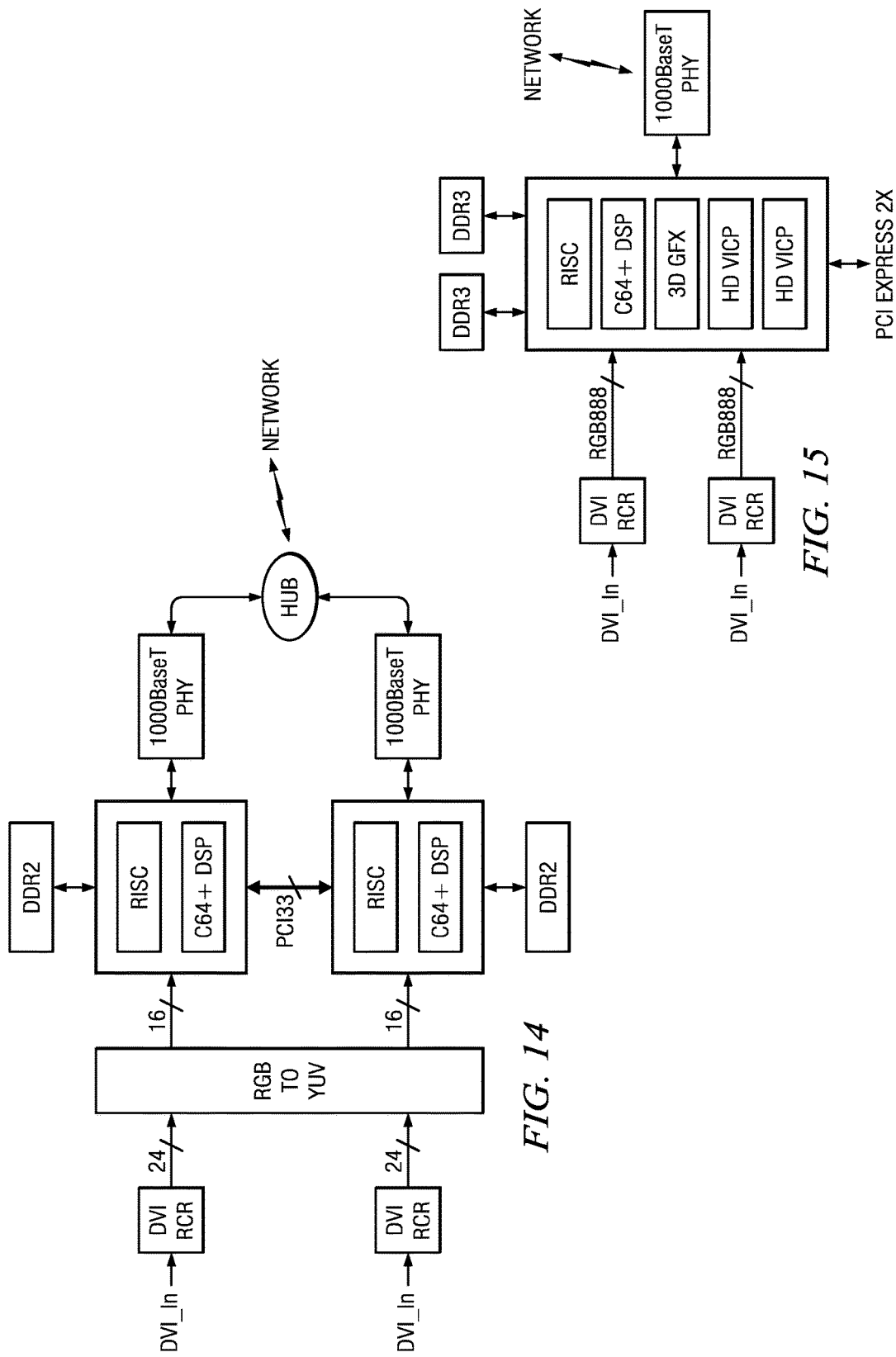

HYBRID VIDEO AND GRAPHICS SYSTEM WITH AUTOMATIC CONTENT DETECTION PROCESS, AND OTHER CIRCUITS, PROCESSES, AND SYSTEMS

CROSS-REFERENCE TO RELATED APPLICATIONS

This application is related to provisional U.S. patent application "A Hybrid Video and Graphics System with Automatic Content Detection Process, and Other Circuits, Processes, and Systems" Ser. No. 61/529,526, filed Aug. 31, 2011, for which priority is claimed under 35 U.S.C. 119(e) and all other applicable law, and which is incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, to the extent they have a non-copyright right to do so, but otherwise reserves all copyright rights whatsoever.

BACKGROUND

This invention is in the fields of electronic integrated circuits, digital video and digital signal processing, wireless devices, electronic processors and systems, and remote computing.

An important problem currently believed to be suffered and unsolved by these diverse devices or applications is how to handle video and graphics when video portions or clips can be or are likely to accompany or be embedded in graphics, or vice versa. Remote computing applications such as PC gaming, thin client, and netbook have been growing in the computing space as more compute power is being done or will be done in the upstream, for example cloud computing. Also, video and graphics may occur alternately in succession or be combined on a screen during control of several computers by a particular keyboard, video display, and mouse (KVM). Some systems work oppositely by having several keyboards, video displays, and mice controlling computers that are fewer in number than the keyboards, video displays, and mice. The proliferation of social media and all types of web video and graphics applications challenge the art to handle video and graphics in succession and together.

Graphics with embedded video (and video with embedded graphics) constitutes a dilemma, first, because using a "lossy" video compression process like H.264 and its cousins is very likely to degrade quality of the graphics portion of the screen. On the other hand, applying or using a lossless compression process to preserve the graphics portion may cause received video to exhibit enough video motion artifacts to detract from user experience. "Lossy" in the image compression/decompression art means that some content of an original image supplied for compression becomes somewhat altered in the output from decompression as compared with the original image, due to the compression/decompression processing. "Lossless" means that the original image is reproduced without being altered. A given image compression/decompression process may be lossless with respect to one type of image and lossy with respect to another type of image.

Image compression, even if it involves some loss of information end-to-end by the time of eventual display, is an important technology because it very substantially reduces the amount or rate of information that needs to be employed to convey an image from its source to a destination compared to the more modest attendant loss of information end-to-end due to the compression/decompression process itself. Image compression can also conserve or reduce memory for greater economy and/or more responsive device performance, impact on overall energy consumption, and better user experience. Different methods of image compression and decompression process the information differently, have different objectives and can have different properties and effects on images passing through them. For some background on some known systems with quite different objectives and techniques, see US Patent Application Publication 20110078532 "Method and System for Low Latency Transfer Protocol," dated Mar. 31, 2011; US Patent Application Publication 20100135397 "Video Encoding Apparatus and Video Encoding Method," dated Jun. 3, 2010; and US Patent Application Publication 20100316126, "Motion-Based Dynamic Resolution Multiple Bit Rate Video Encoding" dated Dec. 16, 2010.

Computers are very powerful now and will become more powerful in the future. This makes remote desktop applications very practical from the viewpoint of computing power. An important challenge or question facing the art is how to provide devices and processes that can deliver high quality graphics and video in diverse instances wherein they occur simultaneously or in rapid succession. The art is challenged to deliver same in the midst of a plethora of mutually-contradictory user and system demands, such as for high image quality regardless of the type of image or of portions of a composite image, demands for low latency, rapid response, bandwidth conservation, low power and energy consumption and effective power management, and for long battery life in battery-powered devices.

Accordingly, some remarkable technological departures for devices, systems, and processes for handling such multiple kinds of content would be most desirable.

SUMMARY OF THE INVENTION

In general, and in one form of the invention, a computing device includes a storage that over time is operable to include video and graphics content, and the storage includes a first set of instructions representing lossy video compression and a second set of instructions representing lossless compression; and a processor coupled with the storage, and the processor operable to electronically analyze at least a portion of the content for motion video based on magnitudes of motion vectors and, on detection of a significant amount of motion, further operable to activate the first set of instructions to compress at least the motion video, and otherwise to activate the second set of instructions representing lossless compression to compress at least the graphics.

In general, and in one process form of the invention, a hybrid video/graphics process includes inputting compressed video/graphics content; executing a motion-vector-based test that determines whether motion video is present in a current input image selected from the group consisting of 1) window, 2) screen portion, 3) field, 4) frame, to a sufficient degree to be treated as motion; when motion video is substantially absent, then performing lossless compression process on the applicable content, and when motion is determined to be present, then performing a compression process adapted for motion content; and transmitting the content delivered over time from the diverse compression processes.

In general, and in another form of the invention, a hybrid video/graphics processor includes a video/graphics input circuit for content selected from the group consisting of 1) window, 2) screen portion, 3) field, 4) frame; a determination module coupled with the input circuit, the determination module operable to determine whether motion video is present; a first decompression module operable in response to the determination module determines that motion video is substantially absent, to losslessly-decompress the current content; a second decompression module operable when the determination module determines that motion is present, to perform motion content-decompression, wherein said determination module is also operable to determine whether an additional new window is being opened in a frame and when a window-opening event occurs, then to also determine whether the frame and the new window have an identical type of content selected from the group consisting of 1) motion and 2) non-motion, and in that case to activate decompression correspondingly selected from the group consisting of 1) lossy and 2) lossless for the frame and new window combination together; and a combiner module coupled for input from the first decompression module and the second decompression module, the combiner operable to combine the content delivered over time from the first decompression module and the second decompression module.

In general, and in another process form of the invention, a hybrid video/graphics decompression process includes inputting compressed video and graphics and metadata identifying them, electronically determining from the metadata whether a frame of input content is video-only, if video-only then video-decompressing the entire frame, and if not video-only then electronically separating compressed graphics content from compressed video content, selectively routing the separated graphics content to lossless decompression, and routing the separated video content to lossy decompression, growing and pruning a decision tree to populate a frame with a number of windows of various sizes so that the applicable decompressions are provided to the frame and any such windows respectively, and combining the decompressed results of the lossless decompression and of the lossy decompression to supply decompressed video and graphics as output.

In general, a further form of the invention involves a peripheral device for use with a mobile platform. The peripheral device includes a card connector assembly including a first bus for pluggable connection, an electronic interface circuit connected to the first bus, and a second bus connected to the electronic interface circuit; and a processor connected to the second bus and operable to detect motion/non-motion image types and establish dynamically-selected compression/decompression modes for video/graphics portions respectively of combined video/graphics content, the processor physically enclosed inside the card connector assembly and coupled via the electronic interface circuit to transfer compressed and decompressed video/graphics via first bus, whereby beyond the card connector assembly upon plugging.

In general, another further form of the invention involves a computing device that includes a video/graphics input circuit for video and graphics content and metadata representing the type of content by motion video or graphics type of content, a storage that includes a first set of instructions representing lossy video decompression and a second set of instructions representing lossless decompression, and a processor coupled with the input circuit and the storage, and the processor operable to electronically detect and respond to the metadata representing motion video or graphics type of content to activate the first set of instructions to decompress the motion video, and otherwise to activate the second set of instructions representing lossless decompression to decompress at least the graphics, the processor also operable to load and edit a metadata storage table in said storage about window-opening and window-closing events, and in response to said metadata storage table to activate and deactivate whichever respective one of said first set of instructions and said second set of instructions that becomes needed and ceases being needed.

Other devices, systems, and processes are disclosed and claimed.

BRIEF DESCRIPTION OF THE DRAWINGS

FIG. 14 is a block diagram of a server embodiment operable to process video and graphics using dynamic mode selection and encoding by process embodiments such as in any of FIGS. 1, 2, 2A and 6, and decoding such as in FIG. 6A.

FIG. 15 is a block diagram of another server embodiment operable to process video and graphics encoded using dynamic mode selection by process embodiments such as in any of FIGS. 1, 2, 2A and 6, and decoding such as in FIG. 6A.

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

Figure 1:
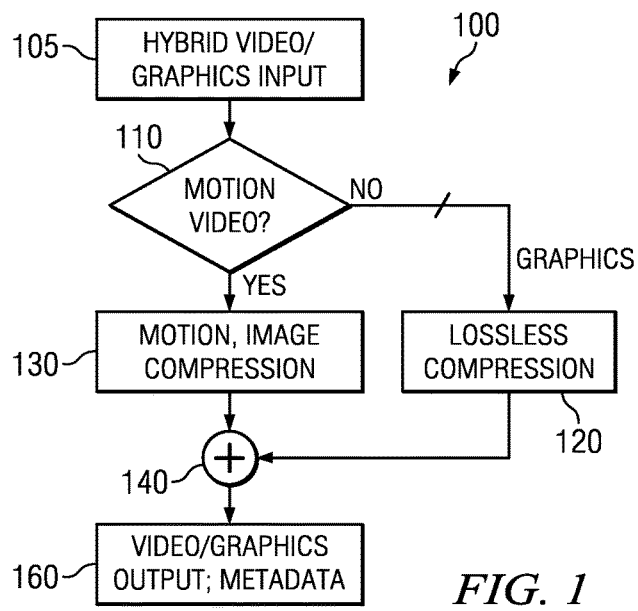
FIG. 1 is a flow diagram of a process embodiment providing dynamic selection of compressive lossy and lossless modes for encode processing video and graphics.

In FIG. 1, an example of a system embodiment solves the problems described in the background earlier hereinabove by automatic detection of the video content and selection of an appropriate module to use (H.264 compression/decompression or lossless compression/decompression instead) in order to maintain the best video and graphics quality. Various embodiments herein recognize that it is not efficient to use only one compression process to compress the image data before sending. Various other embodiments herein also recognize that it is not efficient to use only one decompression process to decompress the image data upon receiving.

In other words, the embodiment of FIG. 1 dynamically monitors the content and determines which of the compressive lossy mode or lossless mode is best to use, and then selects and activates the appropriate mode. Among other remarkable structure and process features, the system has both such a lossy compression (e.g. H.264) module and lossless compression module ported or provided in FIG. 3 onto e.g. a DM6467 HDVICP (High Definition Video Imaging Co-Processor) and:

1. Leverages the DM6467 HDVICP hardware acceleration block to find only the motion vectors and then generate an average or other function of the sum of magnitudes or absolute values of the motion vectors for the current image frame. If a lot (or sufficient amount) of motion is present, the system intelligently selects H.264 to compress the video portion. If not, then the system instead selects a suitably-provided lossless compression module or process to compress the graphics for remote computing applications.

2. Executes a motion check every time the user opens a window to execute a computer application. See FIGS. 1 and 2. The location of the window is obtained by reading the X-Y coordinate registers provided by the graphics driver. Note in one type of arrangement that the motion check may occur at a remote server that is coupled to a thin client local to the user.

Figure 5:
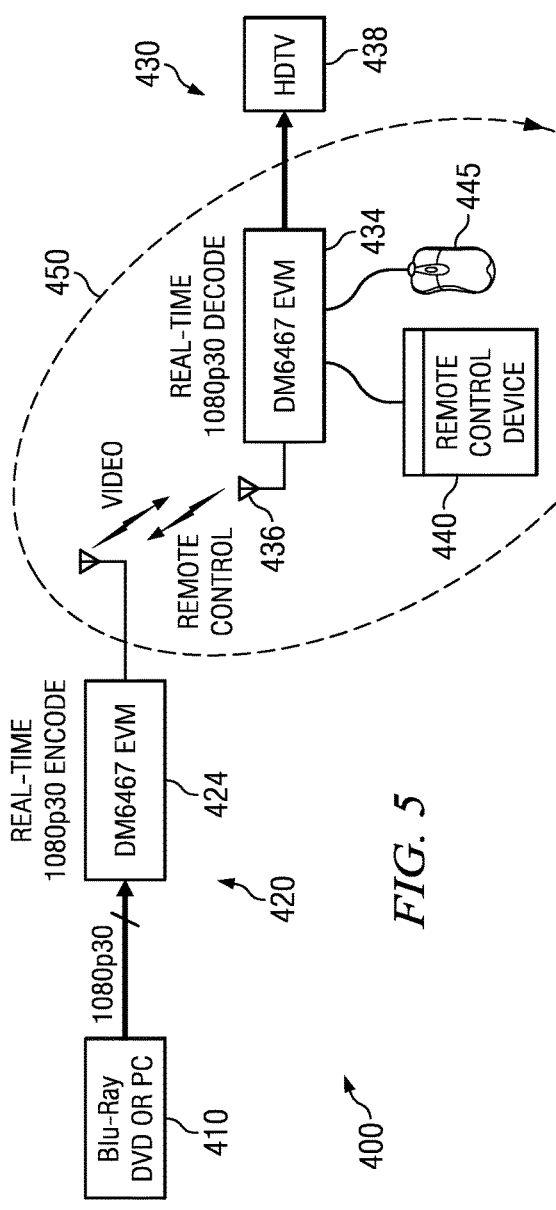
FIG. 5 is a block diagram of a wireless video system embodiment having a two-way wireless connection for video and remote control and operable to process video and graphics using dynamic mode selection by process embodiments such as in any one or more of FIGS. 1, 2, 2A, 6 and/or 6A.

An example of implementation as in FIG. 5 uses two DM6467 EVMs (evaluation modules) from Texas Instruments Inc., Dallas, Tex., that run both H.264 and lossless compressions according to intelligently dynamic selection. Or one DM6467 processor may be used at either end.

For some background on lossy video encoding and decoding, e.g. by H.264, see US Patent Application Publication 20110280314 "Slice Encoding and Decoding Processors, Circuits, Devices, Systems and Processes," dated Nov. 17, 2011; and US Patent Application Publication 20100290533 "Encoders, Decoders, Codecs and Systems and Processes for their Operation and Manufacture" dated Nov. 18, 2010, all of which published patent applications are hereby incorporated herein by reference.

A lossless compression module or process is described in US Patent Application Publication 20110080956 "Reducing Memory Bandwidth for Processing Digital Image Data" dated Apr. 7, 2011, and US Patent Application Publication 20110080947 "Line-Based Compression for Digital Image Data," also dated Apr. 7, 2011 and US Patent Application Publication 20090154819 "Circuit and Method for Adaptive, Lossless Compression of Successive Digital Data" dated Jun. 18, 2009, all of which published patent applications are hereby incorporated herein by reference.

Some remote computing solutions with proprietary lossless algorithms are believed on the market but it is believed that none of these solutions can handle or compress full motion video with graphics both at high quality. By contrast, the embodiments herein intelligently compress full motion video and graphics for remote computing and correspondingly decompress such motion video with high quality at the other end even when accompanied by still content such as graphics in close succession or in the same image and capable of providing the graphics with high quality as well.

Among their advantages, some instances of various embodiments:

1. Automatically detect the image screen and its viewing content and select the right compression/decompression process to be used.
2. Use e.g. DM6467 HDVICP (High Definition Video Imaging Co-Processors) to execute a motion checking subprocess embodiment.
3. Use e.g. DM6467 HDVICP to do H.264 compression for video and DM6467 DSP to do lossless compression for graphics. This enables parallel video and graphics compression paths, as in FIG. 6.
4. One or more process modules for lossless and/or lossy compression can be provided by an original manufacturer or later by a downstream manufacturer or system integrator in a supply chain to make embodiments.

Processing based on magnitude of motion vectors is here considered preferable for graphics/video codec circuits and processing embodiments than a mere equality test on frames/windows for switching or selecting between lossless and lossy encoding and for generating metadata to ultimately control or switch between lossless and lossy decoding. Processing based on magnitude of motion vectors is better than inequality testing because this magnitude approach to codec control refers some frames/windows to lossless coding that would fail an equality test, such as some frames/windows/insets with slowly moving content or slow-and-distributed motions in subregions for which lossless decoding can benefit the human eye with greater resolution of lossless encoding compared to lossy encoding. Embodiments of circuits and processing herein control switching or selecting between e.g., lossless and lossy encoding. The type of problems and context addressed here are thus quite different from other kinds of problems, such as a kind of problem to find motion boundaries to predict whether a lot of change is going to occur and to adjust motion quality of a region where a predictive residual is likely to change a lot, or another kind of problem to control the rates of a multiple-bit-rate lossy encoder only.

In some embodiments, a lossless compression module can be conveniently added when implemented or subsequently as desired. That way, two or more companies can be involved. For instance, one company can provide as an intermediate product most of the hardware and software platform to include the processors, storage, and dynamic selection software is described herein as well as, e.g., an H.264 video codec. A second company can provide the windows-based software and applications, and can include its proprietary lossless compression module as a completed differentiated product of the second company. The particular portions provided by each of the companies can alternatively have some other permutations and combinations of the above items.

Among other device and system embodiments, remote gaming devices and wireless docking units are suitably implemented. Example device embodiments include commercial and consumer servers and thin clients or remote desktops, wireless docking station, and wireless consumer desktop, cloud computing servers and clients, game servers and game stations, tablets, high quality digital signage, high quality wireless projectors, and dramatically improved video conferencing units. (Current video conferencing is believed to encode desktop video as pure video, which degrades the quality of graphics and text.)

A remote terminal embodiment thus is capable of dynamic and selectively-operable lossless image processing and H.264 HD video processing as well. A server embodiment has software-based dynamic graphics/video encoding as taught herein running on the server. The remote terminal device embodiment has 1) low latency lossless compression for viewing graphics or H.264 for viewing full motion video and the system automatically detects the viewing content to decide which mode is best for the user; and 2) special system-on-chip SoC architecture (e.g., DM6467) enables low latency H.264 HD encode/decode for motion video and lossless compression as well for graphics.

This way, embodiments of a device and electronic process embodiments of operation selectively execute lossless compression on graphics and lossy compression on video, plus motion analysis or compensation re-used to support both types of compression dynamically.

Some embodiments have both encode and decode each with the dynamic graphics/video processing as taught herein. Other embodiments have only encode with the dynamic graphics/video encoding as taught herein. Still other embodiments have only decode with the dynamic graphics/video decoding as taught herein.

In one example, a lossless video compression codec runs on a C6211 digital signal processor from Texas Instruments at 1260×1024 resolution, for instance. The encoding parameters of a H.264 encoder are suitably configured or adjusted to obtain optimized static video and computer graphics. Further, dynamic selection processing herein dynamically switches from Lossless to Lossy (e.g., H.264) encoding mode depending on the viewing contents. An example of such switching, as in FIG. 1, selects the lossless codec for high quality computer graphics and selects the lossy H.264 codec for high quality web videos.

Low latency encoding of keyboard and mouse commands is also readily provided, included and combined with such other information. Control of several computers by a particular keyboard, video display, and mouse is called KVM. Some systems work oppositely by having several keyboards, video displays, and mice controlling computers that are fewer in number than the keyboards, video displays, and mice. Various embodiments as described here can support hybrid remote terminals, KVM extenders, KVM switches, networks and other types of KVM and other control. Gaming and wireless docking units can also be improved according to various embodiments. Wireless docking station embodiments connect a user's laptop to a nearby or remote display monitor wirelessly without docking and provide high-quality mixed video/graphics content. Thin client devices, cloud computing clients, videoconferencing systems, handsets, tablets, workstations, servers, and blade PCs can be provided as or made into embodiments as taught herein.

Videoconferencing systems can be improved by detecting the presence of graphics and text and compressing them losslessly, thereby avoiding conventional lossy encoding of desktop graphics and video as pure video. High-quality digital signage is made possible so that such digital signage displays both video and graphics with high-quality either together or as one or the other is displayed on the signage separately over time. High image quality of wireless projector embodiments is promoted and provided by dynamic motion-based controls to selectively display video supported by a controlled codec appropriate to video, and to display graphics supported by a controlled codec appropriate to graphics.

In FIG. 1, hybrid video/graphics process embodiment 100 is fed with video/graphics input at an input step 105 and proceeds to a decision step 110 that executes a motion-vector-based test that determines whether motion video is present in the current window, screen portion, field, frame or frames of content to a sufficient degree to be treated as motion. If not, operations proceed to a step 120 that performs lossless compression on the applicable content. If motion (Yes), operations instead go from step 110 to a step 130 that performs a compression procedure such as H.264 or other procedure that is appropriate for content including motion. A further step 140 combines the diversely compressed content delivered over time from steps 120 and 130. For streaming content, step 140 timewise assembles and formats the content from steps 120 and 130 into the desired stream as video/graphics output 160 of FIG. 1. In cases wherein some content is to be buffered in a buffer, or stored in a memory, flash drive, hard drive, DVD, or other storage, combining step 140 suitably assembles, formats, and writes the diversely compressed content to the storage in the storage areas specified for it. For decompression, analogous process blocks to those of FIG. 1 are provided, except adapted appropriately for decompression or codec use (compression/decompression) as discussed in more detail later hereinbelow.

Figure 2:
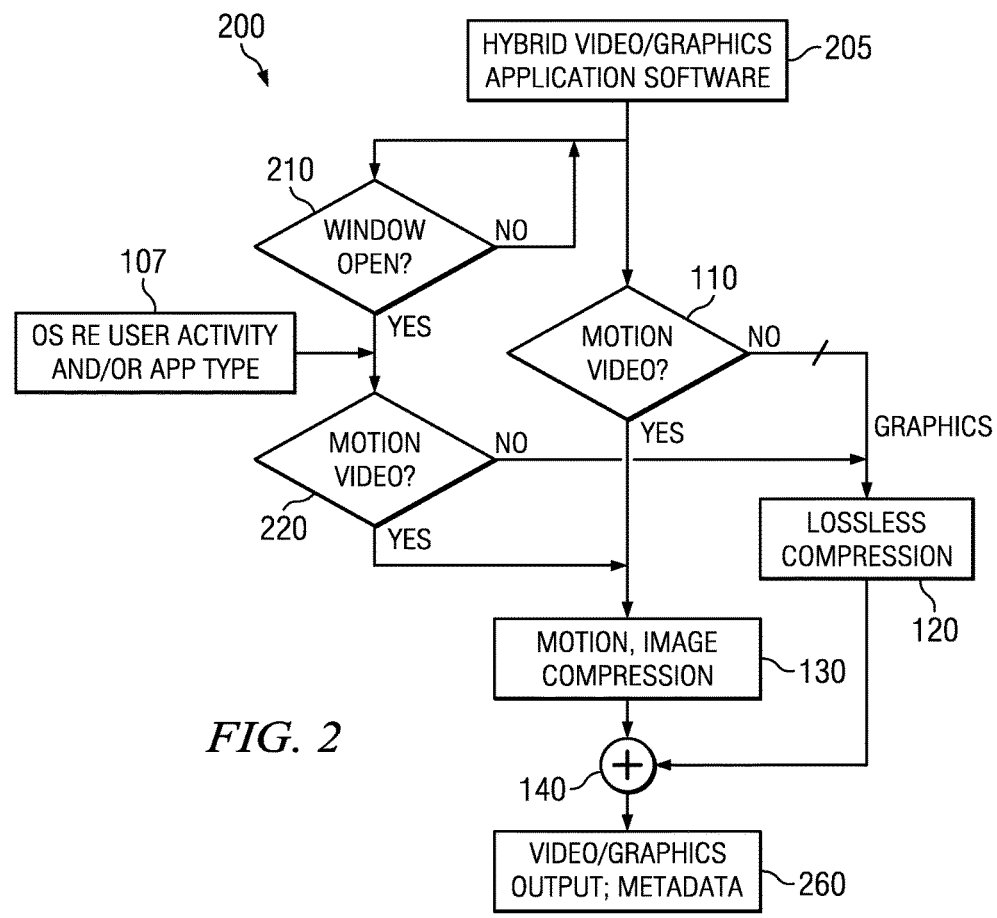
FIG. 2 is a flow diagram of another process embodiment for hybrid video/graphics application involving dynamic selection of compression modes when an image window is opened.

In FIG. 2, another hybrid video/graphics process embodiment 200 has hybrid video/graphics application software 205 that selectively feeds process 100 of FIG. 1 with video/graphics content is described for FIG. 1 herein. Additionally, process 200 is responsive to application software 205 at a step 210 to determine whether a new window is being opened on the screen and to have step 210 deferred or waiting (as symbolized by a branch back) until the window-opening event occurs. Then operations go from step 210 to a step 220 that executes a test that checks for a motion-indicating datum associated with the window or if no such datum is provided then a motion-vector-based test like that of step 110 that determines whether motion video is present in the newly-opened window, screen portion, field, frame or frames of content to a sufficient degree to be treated as motion. If motion (Yes) at step 220, operations go to the step 130 that performs a compression procedure such as H.264 or other procedure that is appropriate for content including motion. Otherwise, if no significant motion (No) step 220, operations go instead to the step 120 that performs lossless compression on the applicable content. Combining step 140 operates as described hereinabove. Embodiment 200 is useful in a windows-based computer such as a PC or server. Some applications such as embedded applications suitably use process 100 in the background, and windows-based screens and content are handled in the foreground in the rest of process 200. For decompression, analogous process blocks to those of FIG. 1 are provided, except adapted appropriately for decompression or codec use (compression/decompression).

In FIG. 2, these additional decision steps 210 and 220 are explicitly illustrated and emphasize that the process 200 handles multiple content types and multiple content sources in parallel to any multiplicity number M (M=2 shown). This way, multiple blocks or modules in FIG. 2 can be active at the same time. Also, step 210 detects when one or more content sources open up each new window anywhere on screen from the user's viewpoint. For instance, suppose at the application layer, operations mouse over to a corner of a screen currently showing graphics, and a mouse operation loads in a video into a window covering a smaller or larger fraction of the screen. The operating system or app sends out specific metadata identifying the size and position for each window block and metadata how decoder should ultimately reassemble these blocks. Step 210 responds to this metadata or control signals associated therewith to determine that a new window is being opened. Then step 220 performs motion-based computations to detect motion in the new window defined by the window position and size metadata. This way, operations at step 220 can efficiently detect presence or absence of motion in the new window itself, and do not need to process a whole image frame to detect whether motion exists somewhere in the frame. Step 220 is efficient because fewer pixels are processed in a small window compared to the large number of pixels in a whole frame, which means that operations at step 220 are faster and consume less energy. Moreover, off-loading the motion detection to one or more hardware accelerators (e.g., HDVICP) also increases speed and conserves energy.

In FIG. 2, operations of this process embodiment 200 are described in connection with various scenarios. First, consider frames of motion video with a graphics inset window established therein. Process 200 executes step 110 when the motion video commences and activates step 130 to perform lossy motion-based image compression such as H.264 on such video. If a graphics inset window is concurrently called for, step 210 detects the event and then step 220 determines that no motion exists in the inset window, whereupon lossless compression step 120 is activated. In this way, the system executing process embodiment 200 issues control signals to direct the image processing modes to have both lossy and lossless operations of steps 120 as well as 130 running. If the graphics inset window is subsequently rather than concurrently called for, step 110 has already activated step 130 for the motion video, and subsequently checks for motion in the inset window. Given no motion in this scenario for the inset window, operations branch from step 110 to activate lossless compression 120 on the graphics inset window in addition to the already activated motion-based lossy compression step 130 operating on the video.

Other scenarios are analogous to the scenario described at length hereinabove. In a second scenario, a frame of graphics (still photo, text, graphical geometric shapes, etc., or any combination thereof) occupies the frame, and a video inset window is established too. Step 110 activates lossless compression 120 for the graphics and then motion-based lossy compression 130 when video is called for. If the video inset window is concurrently opened, steps 210 and 220 handle the inset window in parallel with step 110, so that the combined result is that steps 120 and 130 are activated. In a third scenario involving identical types of content, a frame of graphics is established and a graphics inset window is established, and lossless compression operations 120 are performed for the frame and inset combination together as one, e.g., loading up the frame buffer at a same graphics-specific rate and treating the whole graphics-in-graphics screen as graphics. In a fourth scenario, a frame of video and a video inset window are established, and motion-based compression operations 130 are performed for processing the video frame and video inset together in combination as one. A frame buffer is loaded up from the different sources of content at a video-specific rate (same rate for the video frame and video inset). That fourth-scenario video rate is likely more rapid than a third-scenario rate for graphics.

Operations suitably load up the frame buffer with frame content and content from each inset window in, e.g., 8×8 macroblocks, and perform appropriate encoding. Operations can either overwrite inset pixels onto the frame buffer contents for the frame or do partitioning and update or overwrite each corresponding area of the frame buffer specifically with its respective pixels for each window block and metadata. Operations at the decoder end (FIG. 6A) respond to the metadata, and activate the appropriate lossy and/or lossless decompression modules for video and graphics respectively, and respond further to reassemble all the image information to constitute a current display screen.

It is contemplated that frames or screens populated with any number of windows of various sizes large and small are suitably handled by growing and pruning a decision tree based on the process 200 FIG. 2 so that appropriate decisions and compression processing are provided to the various frames and windows. The decision steps 110, 210, 220 in the decision tree are suitably operated at 60 Hz or other suitable rate to accommodate whatever maximum frame rate the display can support, even though the rate of graphics updating by lossless processing step 120 is likely to be slower e.g. 10 Hz. In other words, in the first and second scenarios hereinabove that have mixed decisions, the codecs or steps 120 and 130 run at different rates. In the third scenario involving all graphics, the operations in FIG. 2 run at a slower rate, e.g. 10 frames/sec for 10 Hz graphics. In the fourth scenario involving all video, such as for a video player, rate controls are set by step 110 and/or step 120 for a higher frame rate for lossy compression 130, e.g. 60 Hz for video.

To execute decision step 110, 220, 610, 620, or the like, at least one threshold Th1 is compared with a quantity derived by appropriately combining information already available from, or readily generated based on, some video processing method that provides information about motion in the image or portion thereof. In some such processing methods, the motion information is provided as plural motion vectors V(i) derived from each of various image portions k in the image or frame by comparison with its most-nearly corresponding image portion, if any, in at least one prior image or frame. Employing some kind of average of the motion information is useful in embodiments that handle different windows or image portions k that may have different sizes for which a different number N(k) of motion vectors V(i) exists or for other motion information that is calculated in that image portion k. That way, a same parameter value used for the threshold Th1 can be compared with such motion vector magnitude-average for any given window, image portion, or block and as given in pseudocode in Equation (1) even though the numbers N(k) of motion vectors of different image portions may vary at different times or because they are coming from different sources. (However, other embodiments may employ a magnitude-sum, weighted average of magnitudes MAG, or some other combining process; and these combining processes may use different size-dependent threshold parameter values if desired.)

$$\text{IF}\left(\left[\sum_{i=1}^{N(k)} MAG(V(i))/N(k)\right] > Th1\right) \text{THEN Motion} = \quad (1)$$

1 ELSE Motion = 0

A suitable average for some of the embodiments herein is an average of the sum of absolute values MAG of the motion vectors V(i) (there being N(k) of those vectors) for the current image portion k. Here, the presence of significant motion magnitude itself is detected regardless of direction, such as by using a metric involving average per-window of motion vector magnitudes. This type of magnitude-based metric prevents vector cancellation that might occur in an actual vector sum or actual vector-based average when the image includes blocks representing motions in opposite directions. For video compression, the directions of the motion are important, but for at least some of the present embodiments the magnitude of each motion vector is remarkably used herein for a decision process step as in any of FIGS. 1, 2, 2A and/or 6.

Various other embodiments can alternatively execute the actual processing or computation that determines the mode selection such as, e.g., by detecting and counting multiple motion vectors per frame with magnitudes exceeding a magnitude threshold, and then determining whether or not the count exceeds a count threshold in order to mode-switch to lossy compression or decompression for delivering output.

Either way, evaluating multiple motion vectors and comparing their average magnitude or other metric to a certain threshold desirably helps to avoid false triggering due to noisy video that can create false motion vectors. In this respect, the particular methods of summing or averaging motion vector magnitudes appear to both desirably provide some cancellation of motion vector magnitude variations caused by noise and to detect motion in images that include image blocks with oppositely directed motion vectors.

Magnitude of motion herein refers to a measure that has one same sign (e.g. always positive or always negative) and is a monotonic function of a sum of squares of the motion vector components. (In some embodiments the sum can be a weighted sum with different weights for vertical and horizontal, for instance.) Let $M_v$ and $M_h$ signify components of 2D (two-dimensional) motion. Then some monotonic function $f$ such as $(M_v^2+M_h^2)$ itself, $\text{sqrt}(M_v^2+M_h^2)$, $1/(M_v^2+M_h^2)$, or otherwise can be suitably compared using an inequality such as less-than (<) or greater-than (>) with a threshold parameter Th1 for motion detection purposes, e.g., $[f(M_v^2+M_h^2)<Th1]$.

Average of motion magnitude herein is a combining function that usefully helps cancel noise, provides a more flexible measure across different size regions, and is more sensitive to the motion dynamics of interest here than some other measures of central tendency. Some examples of different averages of magnitude can operate on motion vectors computed for multiple subregions in a given region, and the subregions can be any effective choice of i) subregions that sample and do not exhaust the given region, or ii) subregions that are mutually exclusive and do exhaust the given region, or iii) subregions that overlap with one or more others of the subregions and where the subregions exhaust the given region. Some formulas for average magnitude can determine a function of an average of sum of squares, or an average of a function of a sum of subsets of the squares of the motion vector components in a given region, see, e.g., $$f\left(\sum_{i=1}^{N(k)} (M_{i,v}^2 + wM_{i,h}^2)\right)/N(k) \quad (2)$$

or an alternative expressed by:

$$\sum_{i=1}^{N(k)} f(M_{i,v}^2 + wM_{i,h}^2)/N(k) \quad (3)$$

or an alternative expressed by:

$$\sum_{i=1}^{N(k)} (f1(M_{i,v}^2) + f2(M_{i,h}^2))/N(k) \quad (4)$$

The weight constant w is unity for an unweighted average. Weight constant w>1 for weighting horizontal motion more than vertical motion, and w<1 for weighting horizontal motion less than vertical motion. Equation (1) utilizes an instance of Equation (3), e.g. with function ƒ=sqrt or simply sum of squares. The alternative process of counting multiple motion vectors per frame with magnitudes exceeding a magnitude threshold is another instance of Equation (3), e.g. with function ƒ being a step function. Equation (4) represents sums of functions ƒ1 and ƒ2 that are monotonic functions of squares of various vector components, and functions ƒ1 and ƒ2 are both monotonically increasing or both monotonically decreasing.

In such ways, examples of electronic analyses as hereinabove can be performed by a processor using at least a portion of the video/graphics content based on magnitudes of motion vectors, and to use the results of the analysis to drive different types of compression and decompression.

Figure 10:
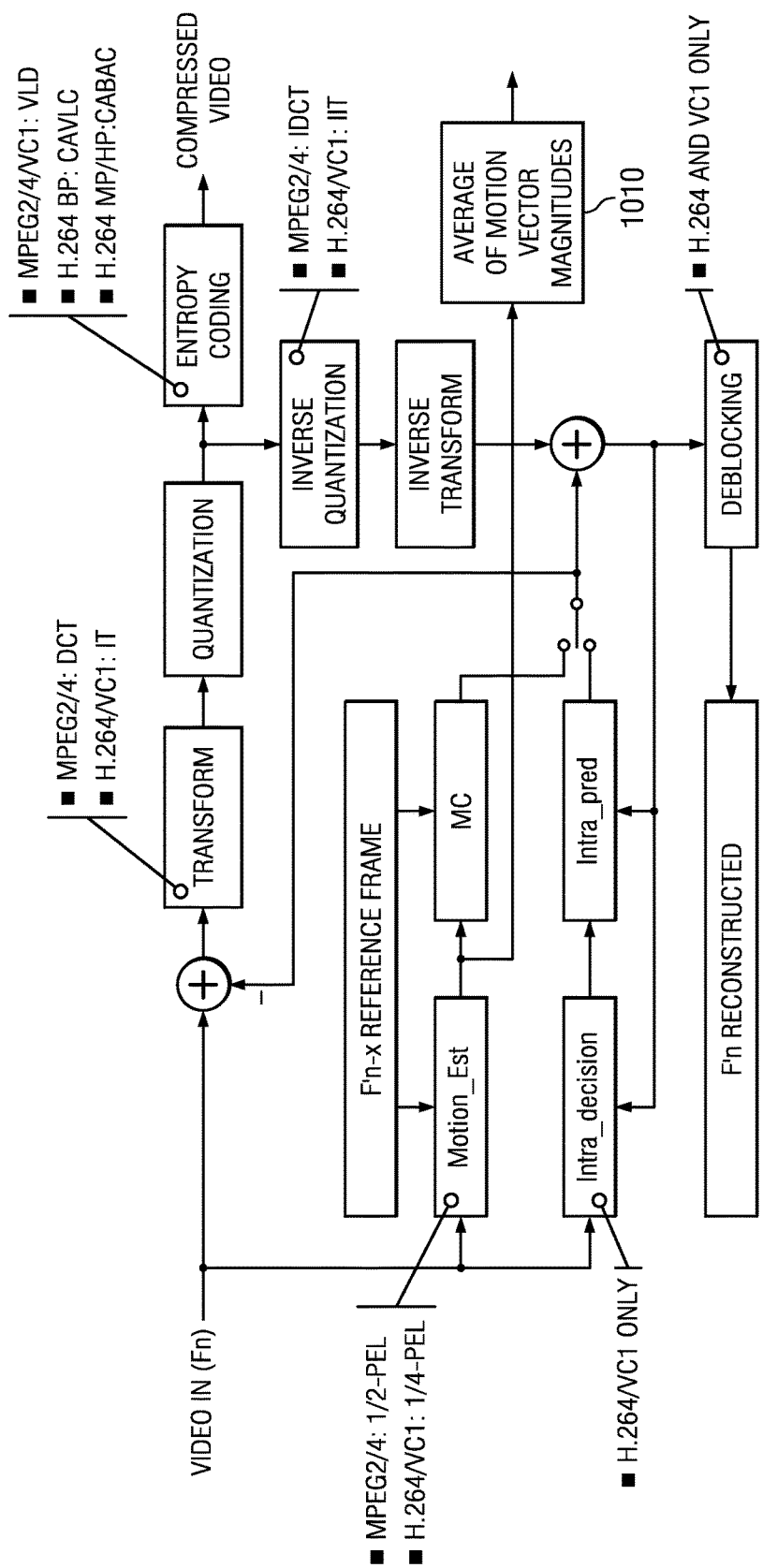
FIG. 10 is a flow diagram of H.264 encode and inventive modifications using motion vectors from a motion estimation block ME to drive the dynamic mode selection by a process embodiment such as in any one or more of FIGS. 1, 2, 2A, and/or 6.

In FIG. 10, a block diagram of H.264 encode shows the motion vectors to drive the dynamic mode selection are coming from the output of a motion estimation block ME (see 'Motion Est' block). An example of a subprocess embodiment adds a first additional block 1010 that derives the motion vector magnitudes, averages them, and compares with a threshold parameter value, e.g. Th1. A further additional block executes the mode switching according to FIG. 1 step 110 or the like in FIGS. 2, 2A and/or 6.

Frames that have mixed content of video and graphics, or either video or graphics only, are represented by arrays of pixels. A type of embodiment suitably executes enough blocks such as may be found in a lossy compression or decompression module to accomplish motion processing to detect motion from one frame to another to determine whether motion is present or not. In the meantime, lossless compression or decompression is executed in case the motion processing does not detect the presence of motion. If motion is not detected, the output from the embodiment is selected to come from the lossless compression or decompression. If motion is detected, a lossy mode or compression or decompression (e.g., H.264) is automatically selected, activated, fully executed and coupled for output. Some embodiments automatically select that lossy mode provided that motion is detected, whether or not that motion or motion video only happens in a window that is smaller than the frame. In other words, this type of embodiment is operative regardless of the motion or motionless type of frame or image portion to execute its motion detector to determine if the image is truly motionless, e.g. graphics, or includes motion video instead.

Since various embodiments allow for dynamic switching between lossy and lossless processing modes, then changing modes possibly might generate some visible artifacts or visible differences from a frame of the video or graphics prior to the mode switching instant to such a frame subsequent to the mode switching instant. To minimize a rate of production of possible artifacts that do not necessarily, but might, result from such motion-based mode switching, such embodiments suitably also include a hysteresis-based process that utilizes a pair of thresholds Th1 and Th2 compared with a varying average magnitude of motion vectors in the image to more deliberately generate the mode switching events and prevent undue instances of mode switching behavior at noisy switchover points. A minimum-interval timer is alternatively or additionally used to avoid undulyshort times between switching instances as well.

From a straightforward error analysis point of view, the thresholded average of motion vector magnitudes itself might be subject to a first type of error in which the lossy processing is briefly used when lossless processing is appropriate, as well as a second type of error in which the lossless processing is briefly used when lossy processing is more appropriate. Analogously, the just-described hysteresis and minimum-interval timer methods might themselves both reduce or make a contribution to each type of error in process-specific ways. The skilled worker can perform computations and measurements of error probabilities and further employ viewing tests by user-subjects to verify particular embodiments and obtain data to adjust parameters used therein.

Rate and visibility of such visual artifacts, if any, can be minimized or reduced in these and other ways. For instance, the process can do dynamic block partition at the window boundary when a new window opens and a boundary crosses a block. Such operation can, for example, repartition a 32×64 block and then operate at a different frame rate. When a window is not a square, a bigger square that encompasses the window can be used as a partition for improved image quality. Repartitioning can be useful when a window boundary crosses an existing block. Also, a circular window can be re-partitioned with rectangular blocks.

Figure 6:
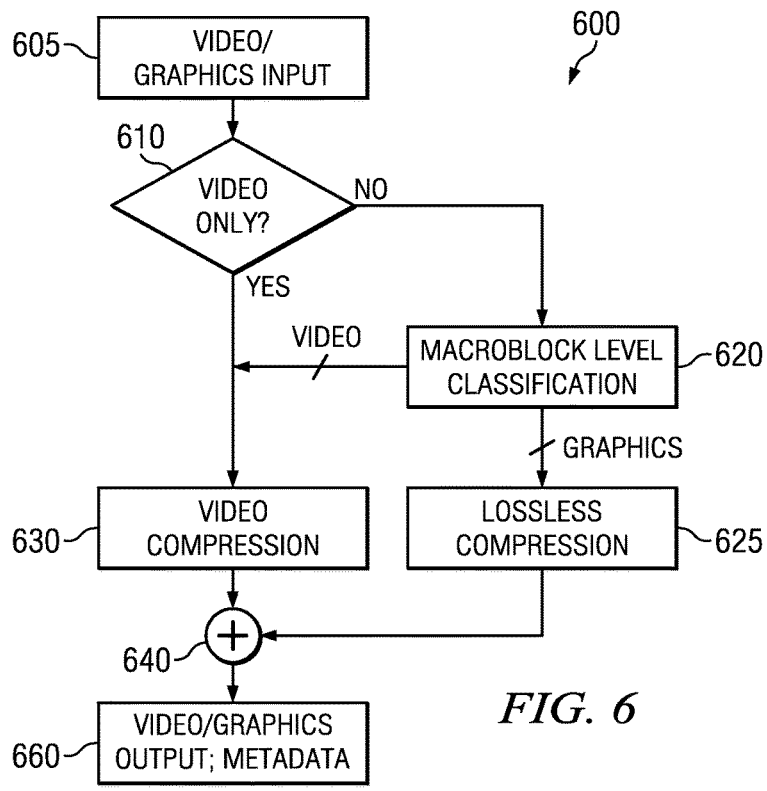
FIG. 6 is a flow diagram of a further process embodiment providing dynamic selection of compressive lossy and lossless modes for encode processing video and graphics based on macroblock-level classification.

In FIG. 2 for instance, when several windows are involved, the process suitably forms a multiple decision tree and analyzes a previous frame, multiple previous frames, and takes the interval into account. Even if the process of FIG. 1 or 2 selects a wrong mode, the compression processes can code the contents satisfactorily, albeit perhaps sometimes at expense of coding efficiency. For example, a movie with a mostly-still scene that persists for some time might include a small image portion including a moving person or object as if very far away in the scene. The mode selection process of FIG. 1 might decide to encode the scene as graphics (motionless image) and do it successfully because the vast majority of the scene is motionless. Also, when the process of FIG. 6 is used, the small motion portion of the scene can be partitioned, and a macroblock (or perhaps more than one) would be detected as containing motion whereupon each such macroblock would be encoded as video.

In somewhat more complicated embodiments, different windows in a frame are identified to the extent they are present, and motion detection processing is executed on each such window separately. Depending upon the determination of motion or non-motion in each such window, such embodiment then determines and employs the best compression method for the frame. In some of these embodiments, different compression modes or methods are applied to each different window and to the rest of the frame depending on the motion or lack of motion of the content detected therein. In such type of embodiment, the decoder decodes a mixed stream and may employ both lossless and lossy video compression techniques. Economic and performance considerations are suitably assessed in determining particular arrangements in such types of embodiment.

For example, suppose the frame has graphics as well as motion video. Such process embodiment losslessly compresses the graphics and separately applies a lossy process like H.264 to the motion video, with the two modes running in parallel concurrently. It is possible to mix both video and graphics in a given frame and still process the information differently according to different modes. The encoder (compressor) provides the mixed stream of graphics and video and/or can be adapted to send codes identifying their locations and sizes and their status as graphics or motion video. In some embodiments, the decoder (decompressor) is adapted to parse or analyze the mixed stream and decode the video and graphics information appropriately according to the respective types of decoding appropriate to them. In some embodiments, a graphical element such as a cursor may be moved, and identification of that element as graphical is used to handle it graphically and according to its varying coordinates rather than as video even though motion of the cursor might be present from frame to frame. If the frame is accompanied by such codes identifying locations and sizes and status as graphics or motion video, then the decoder is arranged to detect and respond to such codes and decode the compressed video and differently-compressed graphics information according to the respective types of decoding applicable to them. In some systems, such as a system in which the compressor runs on a more powerful processor than the decompressor and may be located remotely, this coded type of embodiment can be useful to situate in the compressor the process that generates the codes.

It is believed that lossy compression (e.g., H.264, MPEG-4, AVS, etc.) of both motion video and lower resolution or lower quality graphics on the same screen can somewhat-further degrade the quality of the lower quality graphics. Accordingly, using graphics with high resolution and color depths is helpful for maintaining graphics quality in such a mixed-content lossy compression scenario that already has motion video adequately handled by such lossy compression.

Some of the embodiments conveniently leverage available hardware accelerators (HDVICP and IVAHD (image and video accelerator—high definition) built into any commercially available SoC (system on chip), such as the DM6467 from Texas Instruments Inc., Dallas, Tex. Such embodiment can efficiently tap into or use data generated by a hardware motion estimation engine executing existing CPU cycles that already obtain the motion vectors, without spending additional CPU cycles.

Figure 2A:
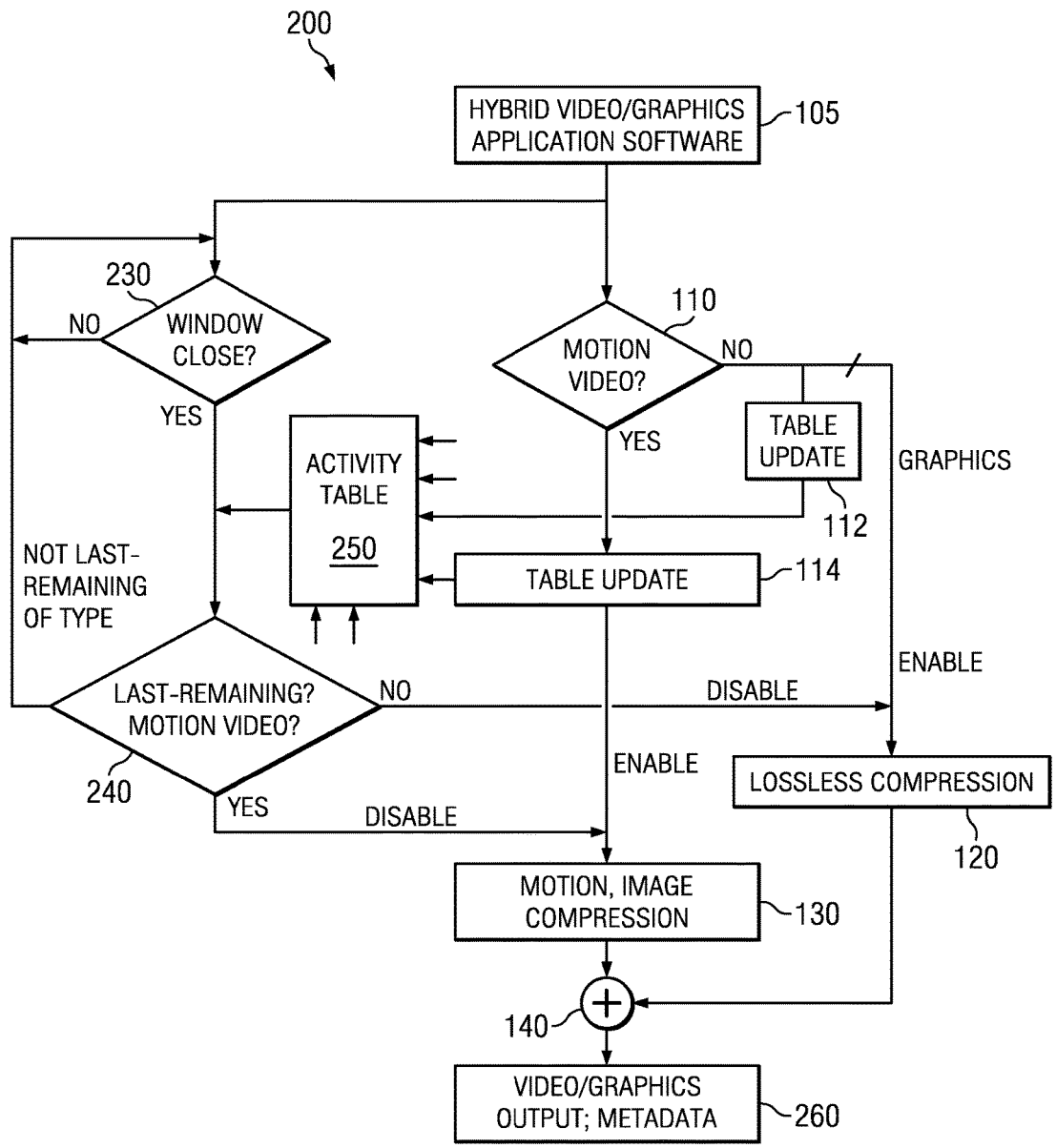
FIG. 2A is a flow diagram of another process embodiment for hybrid video/graphics application involving dynamic enabling and disabling of compression modes when image windows are opened or closed.

In FIG. 2A, process 200 is further depicted to show how it handles a window when it is closed. Compared to FIG. 2, decision steps are organized similarly in FIG. 2A except that they send further appropriate disabling controls to steps 120 and 130 as well. Also, a metadata storage table designated an Activity Table 250 is depicted in FIG. 2A. Activity Table 250 holds information that tells about encoder usage of each encoder and is loaded and edited by table update steps 112, 114, etc., associated with outcomes of the decision steps 110, 210, 220, 230, 240 and suitably accessed by the decision step 240 to determine the nature of the window being closed relative to those that are still open so that the process can determine whether one of the encoders is not currently needed and deactivate it. Multiple arrows to Activity Table 250 indicate respective table update steps (not all shown, typified by steps 112, 114) responsive to the outcomes of the decision steps 110, 210, 220, 230, 240 and can correspond to various update data values indicating motion status, and region-opening and region-closing status, accompanied by table pointer or address values on shared lines in hardware.

In FIG. 2A, closing a last remaining graphics window shuts down the graphics lossless encoder, but closing a not-last-remaining graphics window leaves the lossless encoder running And the state of the H.264 video encoder remains whatever it is—on or off—because the graphics window being closed is not video. Analogously, closing a last remaining video window shuts down the H.264 video encoder (except for ME), but closing a not-last-remaining video window leaves H.264 running because it is still needed for a remaining video window. The state of the lossless graphics encoder remains whatever it is—on or off—because the video window being closed is not graphics.

In FIG. 2A, a decision step 230 determines whether a window is being closed. If yes, operations at a decision step 240 access Activity Table 250 to determine whether the window is a last-remaining graphics window or a last-remaining video window. If neither, then operations return to step 230. However, if the window being closed is a last-remaining graphics window, a disable control is sent to deactivate lossless compression step 120. Alternatively, if the window being closed is a last-remaining video window, a disable control is sent to deactivate the video compression step 130.

Figure 3:
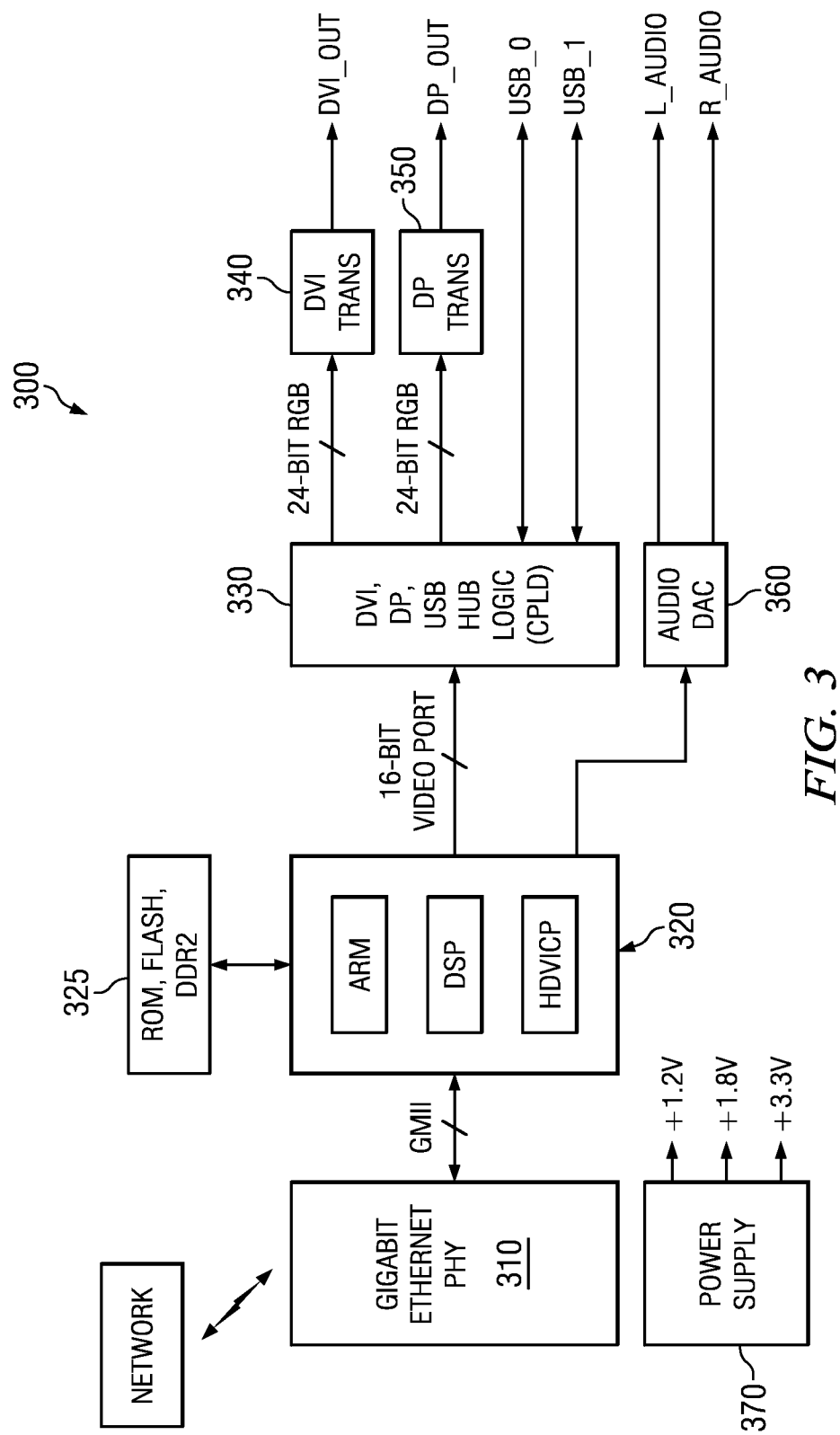
FIG. 3 is a block diagram of a receiving device embodiment operable according to the process of any one or more of FIGS. 1, 2, 2A, 6 and/or 6A.
Figure 12:
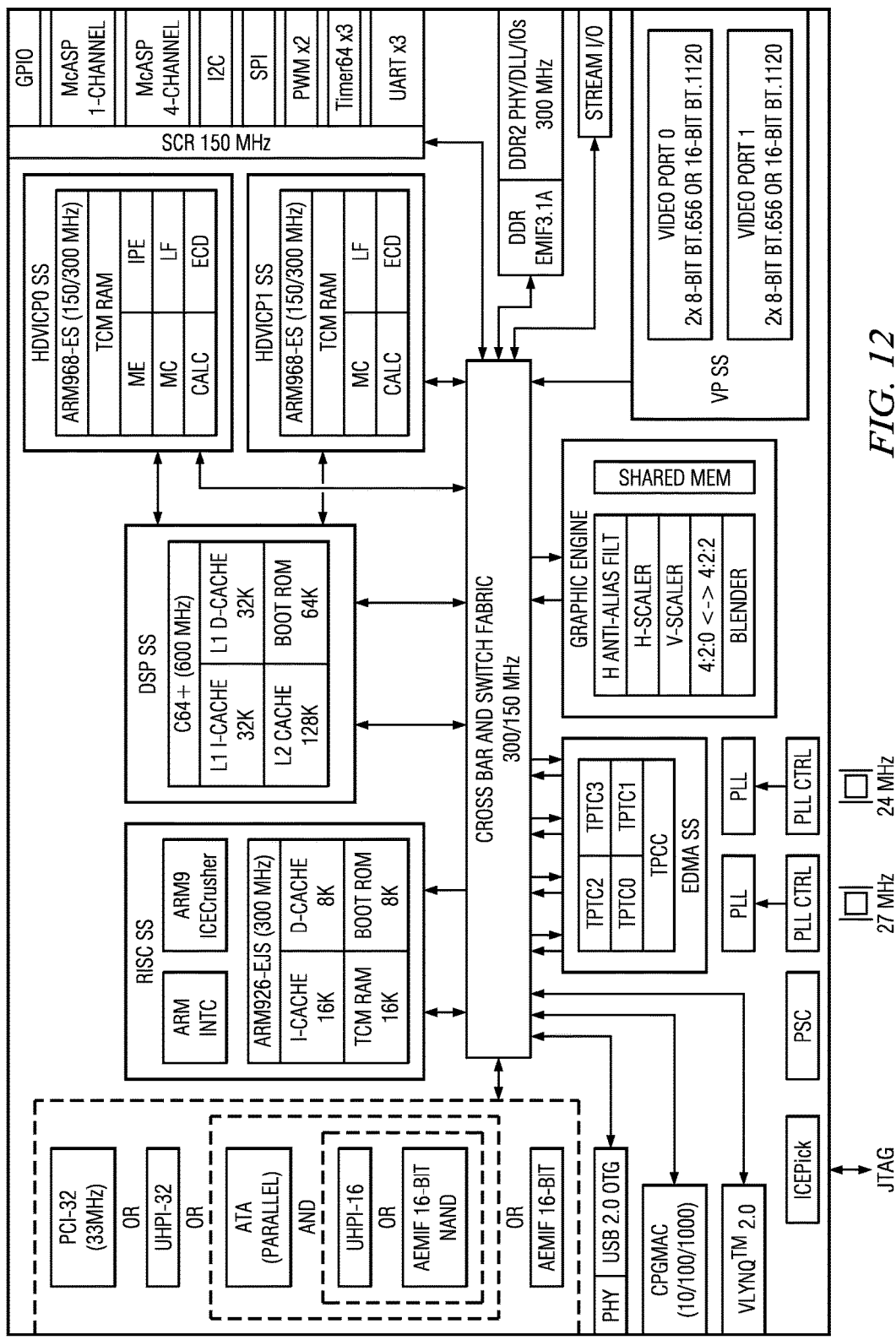
FIG. 12 is a block diagram of a processor SoC (system-on-a-chip) operable to process video and graphics using dynamic mode selection and encoding and decoding by process embodiments such as in any one or more of FIGS. 1, 2, 2A, 6 and/or 6A and the other Figures.
Figure 13:
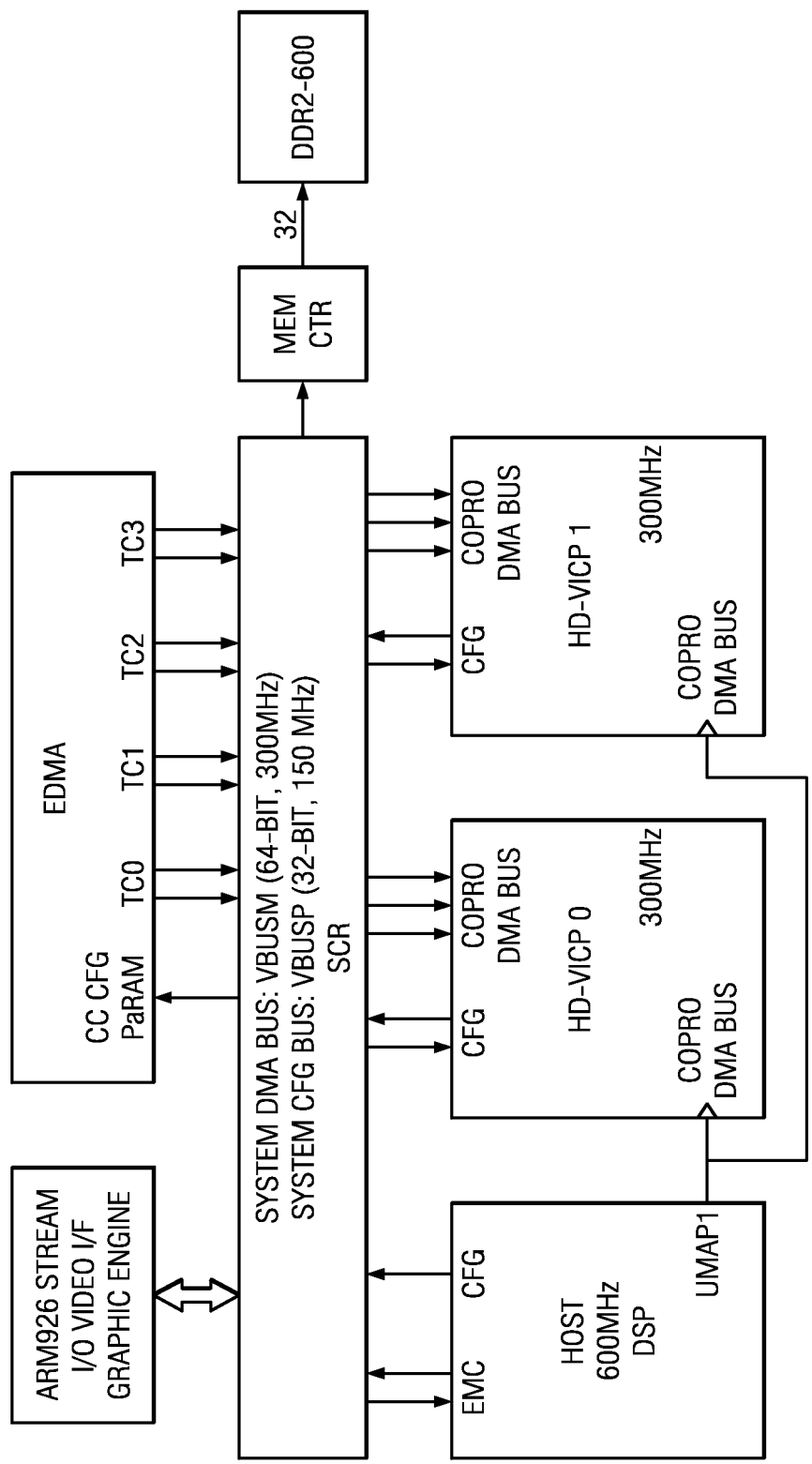
FIG. 13 is a block diagram detailing a portion of the processor SoC of FIG. 12.

In FIG. 3, a system embodiment 300 includes a gigabit Ethernet PHY (physical layer) 310, a main processing chip such as a SoC (system on chip) 320 with memory 325 with storage spaces such as ROM (read only memory), flash (programmable non-volatile memory), DRAM (dynamic random access memory) such as one having a DDR2 interface, a CPLD (complex programmable logic device) interface 330 providing DVI, DP, and USB Hub logic. SoC 320 in one example has a RISC (reduced instruction set computing) core, a DSP (digital signal processor) core, and a HDVICP as shown in FIGS. 12 and 13. A commercially-available DM6467T from Texas Instruments Inc., Dallas, Tex., or other suitable processing device is used for SoC 320. CPLD 330 is suitably a DM8148 or DM8168 from Texas Instruments Inc., Dallas, Tex., or some other CPLD or other suitable circuitry used instead. SoC 320 has a 16-bit video port that conveys video to CPLD 330. In turn, CPLD 330 provides separate 24-bit RGB buses to a DVI (digital visual interface) transmitter circuit 340 to output DVI_Out and/or a DP (display port) packetized data transmitter 350 to an output DP_Out. An audio DAC (digital to analog converter) 360 couples the SoC 320 to left and right stereo audio outputs L_Audio and R_Audio. A power supply 370 supports this system embodiment.

Figure 4:
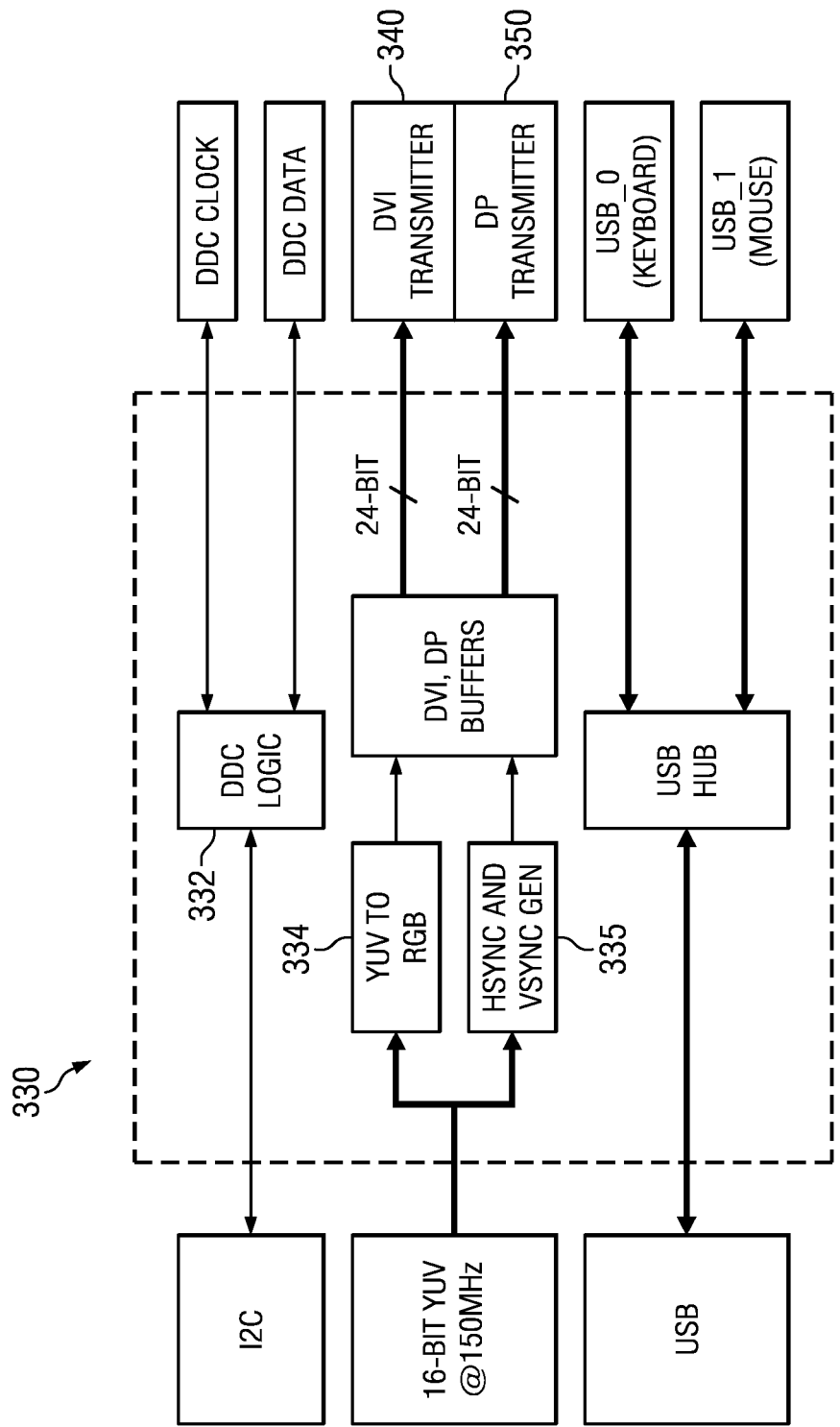
FIG. 4 is a detailed block diagram of an interface logic CPLD (complex programmable logic device) detailing part of the device embodiment of FIG. 3 and an analogous part of transmitting and/or receiving devices in other Figures herein to which its structure and/or operations can apply.

In FIG. 4, a detail of the CPLD interface logic 330 of FIG. 3 includes DDC logic 332 coupled with an I2C bus, DDC Clock and DDC Data. A video input, such as 16 bit YUV at 150 MHz, and is supplied to a YUV-to-RGB block 334 and a horizontal and vertical synchronizing block 335 for HSYNC and VSYNC generation. Blocks 334 and 335 provide outputs to DVI and DP buffers that in turn deliver the 24-bit DVI and/or DP outputs to the DVI transmitter 340 and the DP transmitter 350 of FIG. 3. A USB hub is included as well.

In FIG. 5, a wireless network embodiment 400 involves encoding and decoding for a high data density storage disk 410, e.g. using Blu-ray DVD storage, and/or a personal computer PC DVD drive. A transmitter 420 has a DM6467 processor 424 that executes real-time 1080p30 encode and transmits the compressed data using a WLAN (wireless local area network) and/or WAN (wide area net) block therein. Compare with FIGS. 7, 8, 14, 15 and 19. In FIG. 5, a receiver 430 and has its own DM6467 processor 434 that receives the compressed data and decodes and displays it on an HDTV 438 at 1080p30 resolution. Compare with FIGS. 7, 9, 16, 17 and 18. A remote 440 and/or mouse 450 and keyboard control the receiver 430 e.g. as a game station, and the receiver 430 generates remote control commands. Some of the remote control commands from the receiver 430 are encoded and transmitted back to the transmitter 420, such as to request content or addition or alteration of content transmitted from the transmitter 420 to receiver 430 and other receivers like receiver 430 in an interactive group. The receiver 430 can pause and restart the transmitter 420 using the same WLAN channel. In one example of operation, a racing car game concurrently runs on a game-playing station wirelessly while a game-related graphics inset is concurrently shown on the receiver's display. The wireless network embodiment 400 is suitably replicated in reverse for two way and multi-way networking and videoconferencing applications so that each station has a transmitter/receiver combination for encoding and decoding video. The system of FIG. 5 suitably includes one or more process modules using any of the process embodiments herein.

FIG. 5, for one example, shows a gaming station embodiment 430 that provides a remote control device 440 such as a gaming control, an RF mouse 445, a keyboard, a gaming station box 434 including a receiver or back end, a gaming station antenna 436 and an HDTV display 438. The gaming station box 434 also has a control/data transmitter and captures mouse and keyboard and joystick controls to quickly send back gaming commands to video server/transmitter TX 434 from the gaming station box 434 with low latency or delay. The game program and many of its basic images and other files are remotely stored in a storage 410, such as a DVD (digital video disk) high density storage optically accessible, e.g., with very short wavelength blue laser or using a high-capacity PC (personal computer) data storage. Most of the computing burden of the game is borne by a remote high-performance processor structure in the remote video server 424. In some systems wherein the gaming station 434 has sufficient processing power to allow, the server 434 sends commands for the gaming station box 434 to follow to constitute and generate its graphics output. In some systems wherein the gaming station 434 is a thin client with less processing power, the server can execute operations called 'screen scraping' to send already rendered frames to the gaming station 434. In either kind of system, the operations of process embodiments like FIGS. 1, 2, 2A, 6, 6A are applicable.

A gaming example shows the importance of low latency and is illustrated by a car racing game wherein cars race through city streets at close quarters to each other and to building walls. A skilled player of the game makes quick judgments and operates remote control device 440 to prevent sideswipes and collisions of the player's gaming car with other cars or walls. Accordingly, the performance demands of the game call for low latency transfer of video from video server 424 representing the state of game operations to the gaming station box 434. These performance demands conversely call for the gaming station box 434 to communicate commands with low latency (swiftly) from the remote control device 440, mouse 445 and keyboard back to the video server 424. In other words, a loop of cascaded latencies 450 is set up in the human-machine system so that the human user's latency is the preponderant latency in loop 450. That way, from the user's viewpoint the system focuses the performance demands of the game on the user's skill and fast reaction time. To promote this result, the video server 424 is provided with sufficient video performance to communicate high-resolution video that challenges the user not only with rapidly unfolding game events but also fine image details in both video and graphics image portions of sufficient clarity that they can challenge the recognition and response capabilities of the advanced gamer. Moreover, the system is set up to have 1) very low latency in communicating the video from the video server 424 via the gaming station box 434 to the HDTV display 438, and 2) very low latency in communicating user responses back from the remote control device 440, mouse 445 and keyboard back to the video server 424. The gaming station box 434 is suitably configured with high priorities on input device triggers and write interrupts so that RX-TX control path latency or control channel latency is very small. In FIG. 5, first and second Ethernet channels are suitably opened for the respective TX-RX video path and the RX-TX control/data return path if it is desired to avoid time-multiplexing these two paths and as a further measure to keep the latency low.

Figure 5A:
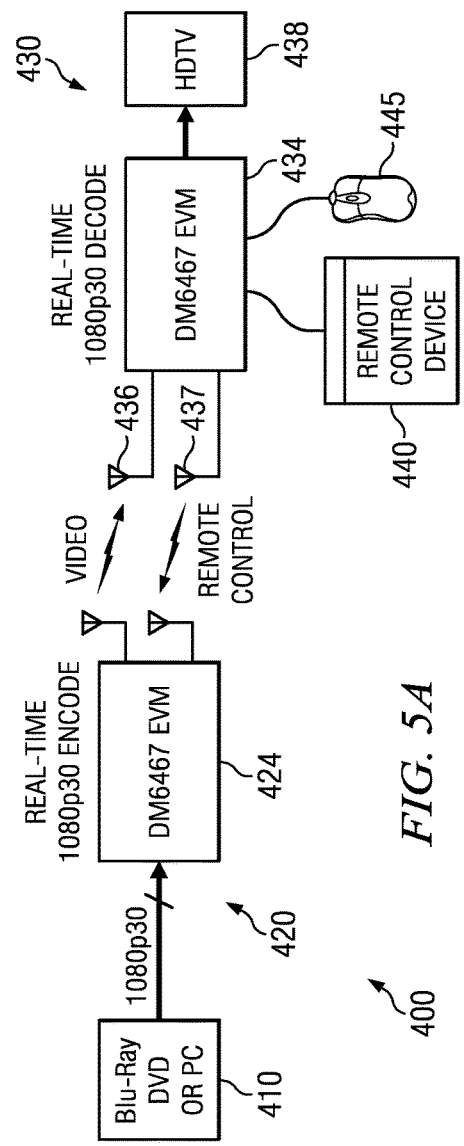
FIG. 5A is a block diagram of a wireless video system embodiment having separate wireless paths for video to receiver and for remote control from receiver and operable to process video and graphics using dynamic mode selection by process embodiments such as in any one or more of FIGS. 1, 2, 2A, 6 and/or 6A.

In FIG. 5A, the RX-TX control path latency or control channel latency and availability are further promoted by providing a dedicated wireless backchannel that sends back remote control signals for gaming separately from the video receive channel. Note that in FIGS. 5 and 5A a first antenna 436 and associated RF circuitry supports the video transfer channel. In FIG. 5A, a dedicated second antenna 437 and additional associated RF circuitry support the control/data backchannel. This RF circuitry includes an RF/TX module in gaming station box 434 and an RF/RX(receive) module for video server 424, which like gaming station box 434 is provided with two antennas. Since several game users each from their respective game station box 434.$i$ may be communicating with the server 424, the dedicated backchannel capacity at server 424 beneficially supports the multiple-player game experience too.

In some games/apps several game/app users each from their respective game/app station box 434.$i$ communicate with the server 424 and interact with each other through the server 424. In some other games/apps several game/app users each from their respective game/app station box 434.$i$ communicate with the server 424 in an individual, solitary manner utilizing the server 424 as if they were the only user. (Some users may be both using the server for an interactive app to interact with other users, and additionally another app that is interactive with different other users and additionally an app that the user uses as a solitary user without interaction with other users.) In still other operations on the server 424, some users communicate with the server 424 and interact with each other through the server 424 while some other users communicate with the server 424 in an individual, solitary manner utilizing the server 424 as if each of those others were the only user.

In this FIG. 5 or 5A system example, a JPEG 2000 image coder at 60 Hz in video server 424 performs continual mixing or mode selection between graphics/video as in any of FIG. 1, 2, 2A, 6 or 6A. Lossless compression 120 handles complexity inside image blocks that include combinations of still photos, motionless macroblocks, and graphics such as a toolbar, an icon, a cursor, a game piece, a window outline, a menu, a radio button, a text box, etc. The image transform used in the lossless compression detects and does not have to distinguish photos from text and other graphics. The system suitably has Intra coding for losslessly compressing frame-to-frame temporal redundancy. Moreover, the system at the same time detects and provides for close-to-lossless (lossy) compression that takes account of between-frames (Inter) motion-based redundancy of video. In this way, high resolution, low latency full screen video playback on HDTV 438 from gaming station box 434 advances the state of the art. The motion detection ME process usable for FIG. 1 step 110 is compatible with three-point search, diamond search, nine-point search, and motion searches in various rectangular blocks. A frame buffer is continually updating on the graphics subsystem or graphics card, e.g., every other frame and running at 30 Hz or other video rate. Delay-wise, this entails one extra frame of delay (about 33 milliseconds) if someone such as a remotely-located gamer opens a small video player window.

In FIG. 6, a macroblock level classification process 620 executes any suitable motion estimation (ME) operations as taught elsewhere herein (see Equation (1) and its discussion) to classify each macroblock as moving or still. A classification signal is then generated by process 620 to produce the separate control outputs shown (e.g. Video or Graphics 'on') and selectively activate the blocks 625 and 630 for the respective macroblocks applicable to them according to such classification. In this way, when insert-windows or picture-in-picture (PIP) image entities are small, the system and process detects and classifies graphics or video macroblocks at a pixel-level of 16×16, 8×8 or down even to 4×4. One or more hardware accelerators provide high-performance, energy-efficient macroblock classification and compression. In other words, if a tiny window opens up as indicated by reception of its dimensional metadata, the process step 610 fails to find video but branches to step 620 that executes macroblock level classification to more accurately determine the type of each such macroblock therein as graphics or video. Thus, step 610 is region-based motion estimation detection e.g. performed on the whole frame or large portion thereof. Step 620 executes a more microscopic scrutiny of the frame at macroblock level to determine whether any small windows exist therein that depart from the type characterizing the frame as a whole. Then step 620 operates the video compression 630 and graphics compression 620 on the particular parts of the frame to which their operations are applicable or most nearly applicable. (Some other embodiments omit the step 610 and video/graphics input 605 goes directly to macroblock-level classification 620 for all frames where such embodiment can support system power/energy constraints and specified performance.)

In FIG. 6, the hybrid video/graphics process embodiment 600 is fed with video/graphics input at an input step 605 and proceeds to a decision step 610 that determines whether the input content is video only. If so (Yes) at step 610, operations proceed directly to video compression 630, e.g. H.264. If not video only (No) at step 610, then the content may be either graphics only or a mixture or aggregation of video and graphics. Operations then branch from step 610 instead to a procedure module 620 for macroblock level classification that separates the graphics content from the video content. The graphics content is separated and fed to a lossless compression block 625, while the video content is separately fed to the video compression 630. A combining module 640 operates analogous to combining step 140 described in connection with FIG. 1 to supply compressed video and graphics and their metadata as output 660 from the process 600 of FIG. 6. For decompression, analogous process blocks to those of FIG. 1 are provided, except adapted appropriately for decompression or codec use (compression/decompression).

Figure 6A:
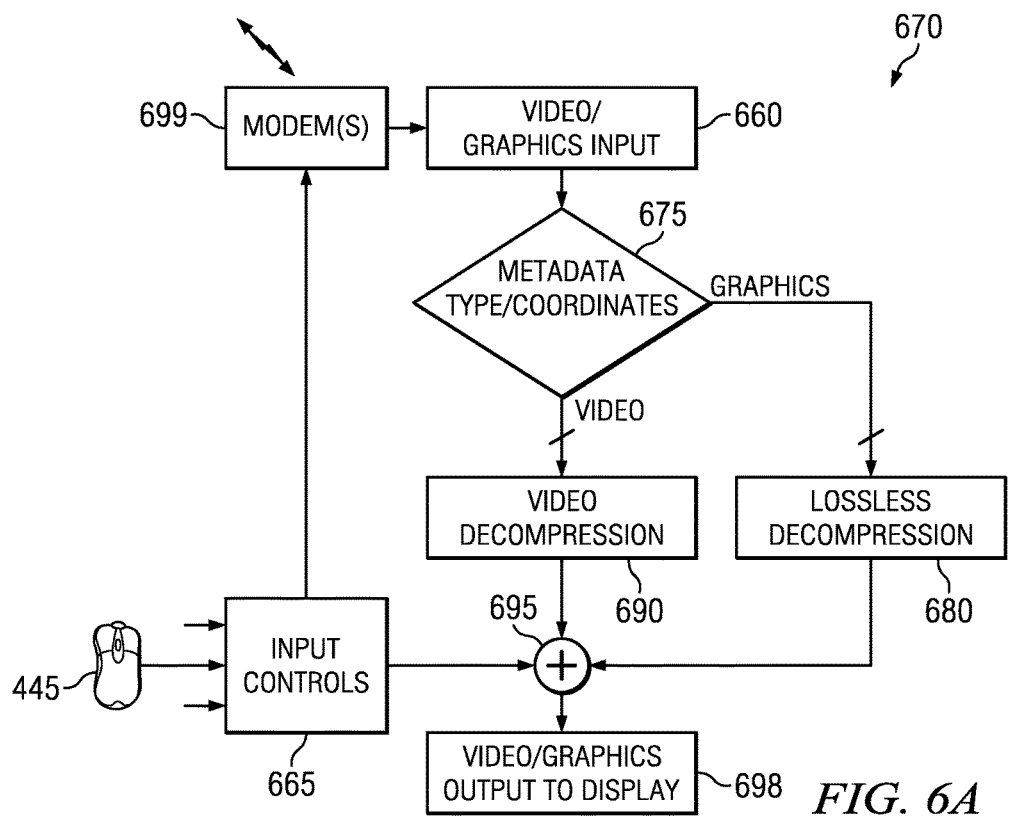
FIG. 6A is a flow diagram of a further process embodiment providing decoding or decompression of received video and graphics previously encoded according to compressive lossy and lossless modes for encode processing video and graphics in FIG. 1, 2, 2A or 6.
Figure 11:
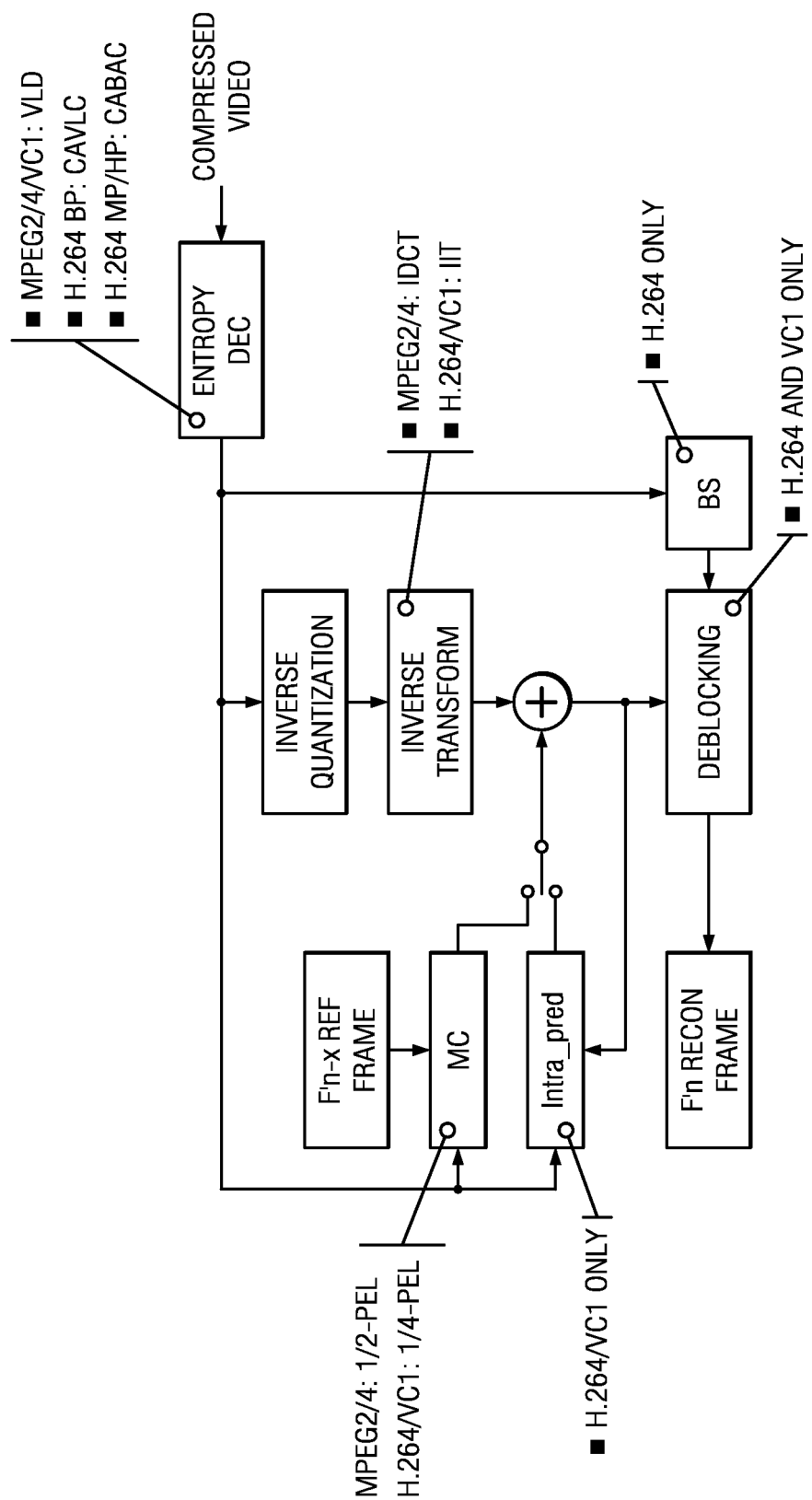
FIG. 11 is a flow diagram of a decode process (e.g. H.264) such as for use in the lossy decompression block of FIG. 6A.

In FIG. 6A, decode processing 670 of received hybrid video/graphics input 660 from FIG. 6 interconnects and operates with lossless decompression 680 and lossy decompression 690 (e.g., see FIG. 11). A control step 675 responds to encoder metadata, e.g., received as remotely-originated controls indicating video or graphics type of content and its position, shape and dimensions to control the decompression steps 680, 690. Basically, the decoder control step 675 does whatever the encoder 600 (or 100 or 200) metadata says to do. Decode processing 670 obtains region coordinates, and encoder metadata for video routes each received video region through video decode 690 and routes each received graphics region through graphics decode 680. On decode, the process in some embodiments decompresses graphics regions at 10 Hz and decompresses video regions at 30 frames per second. Thus, in a combining step 695, such embodiments energy-efficiently mix different content portions processed at different frame rates by steps 680, 690 and the decode process and combining step 695 overlay them into the frame buffer that is used for video/graphics output 698 to a display unit such as HDTV 438 or display monitor (s) 780. One or more human-operable input devices like mouse 445 actuate an input controls module 665 for initiating/closing insets and commands to a modem 699 to transmit controls, and input control circuit also coupled to supply other controls to combining module 695 hardware or software to cause particular e.g. graphics content to be responsively-added locally and bypass some latency for particular applications or display features. Mode switched encode provide a powerful encoder improvement on the transmit side depicted in FIGS. 1, 2, 2A, and/or FIG. 6. Moreover, such encode simplifies decompression software code and makes decode energy-inexpensive on the FIG. 6A receive side while increasing image quality of mixed video/graphics for users.

Figure 7:
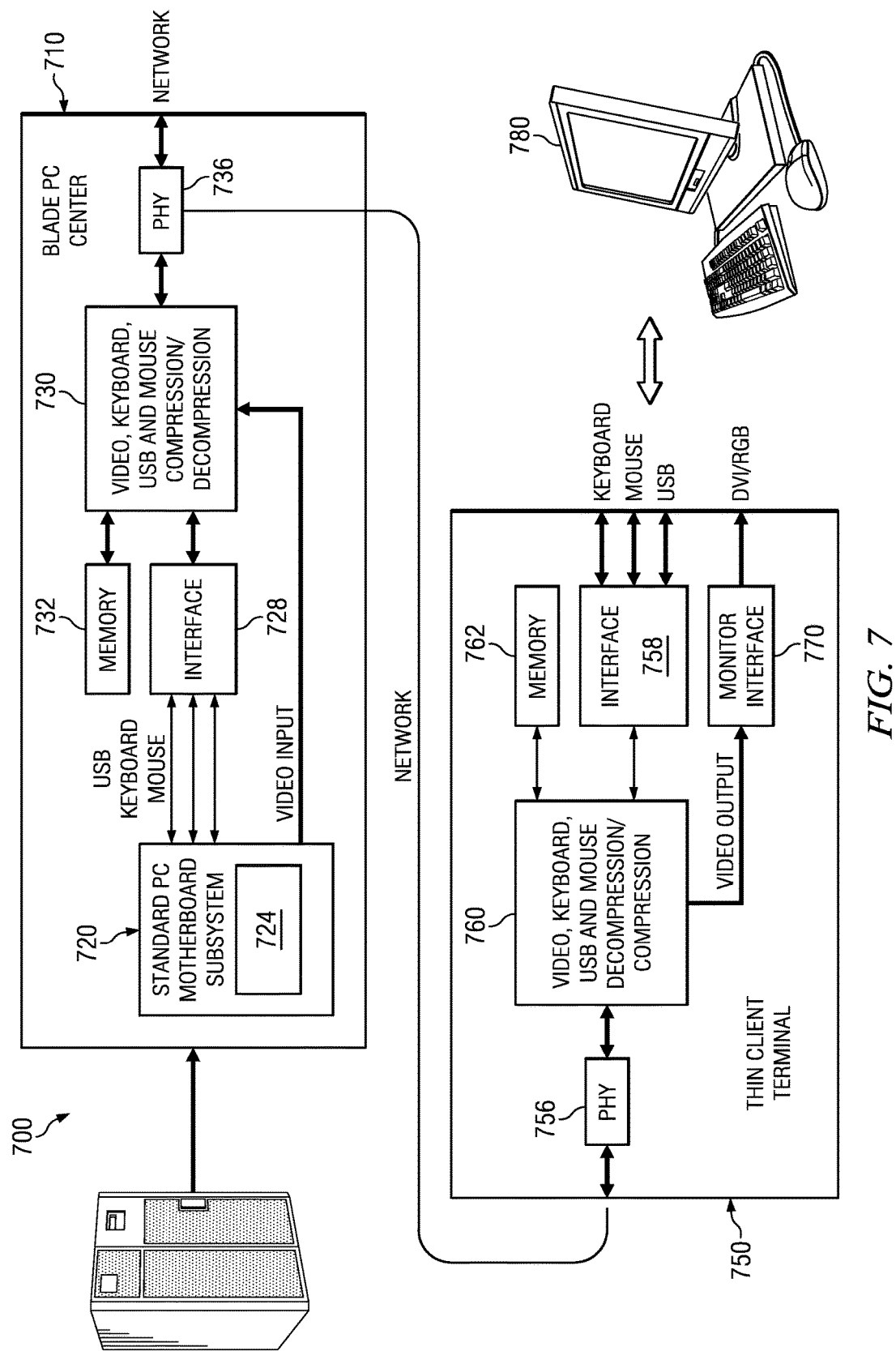
FIG. 7 is a block diagram of a network embodiment having server and client device embodiments improved according to the other Figures, and the network may be wired, wireless, wide-area (WAN), local area (LAN) or otherwise.

In FIG. 7, a computer embodiment 700 such as for cloud computing has a blade or printed circuit card embodiment 710 therein and using any one or more of the process embodiments detailed herein. (Blade PC is server term for a printed circuit card used in the server.) Blade 710 has a computer motherboard subsystem 720 including one or more main microprocessors 724 coupled with interfaces 728 for USB devices, keyboard, mouse, display monitor, headset/microphone, and these and other peripherals in any suitable numbers. Digital RGB (red/green/blue) video input coupling is provided between the microprocessors 724 and a codec circuit block 730 for video, keyboard, USB, and mouse, with compression and decompression according to any one or more of the process embodiments described herein. Codec circuit block 730 is coupled with the interfaces 728, a memory 732, and a network PHY 736 for WAN or LAN wired and/or wireless networking to the extent suitable to support any desired level of communications performance. Codec circuit block 730 has an ADC (analog-to-digital converter) included or associated with block 730 for the RGB input.

Further in FIG. 7, a thin client terminal embodiment 750 has a network PHY 756 for wired and/or wireless networking at the client end to the extent suitable to support any desired level of communications performance, see also discussion of FIGS. 5 and 5A. Interfaces 758 are coupled with USB devices, keyboard, mouse, headset/microphone, and these and other peripherals in any suitable numbers. A codec circuit block 760 has a memory 762, and codec block 760 is coupled with interfaces 758. Codec block 760 is additionally fed by and communicates with PHY 756 for video, keyboard, USB, and mouse, with compression and decompression according to any one or more of the process embodiments described herein. Digital coupling is provided between the codec circuit block 760 and a display monitor interface 770. The digital coupling is e.g. 16-bit YUV from codec block 760 along with an additional HPI (host peripheral interface) line for communication between block 760 and the display monitor interface 770 using a DM6437 processor as an OSD (on-screen display) processor and controller. Alternatively, codec block 760 provides 24-bit RGB to the display monitor interface 770. Display monitor interface 770 provides DVI/RGB drive for one more display monitors 780. The display resolution(s) supported are specified appropriate to the performance desired.

Figure 8:
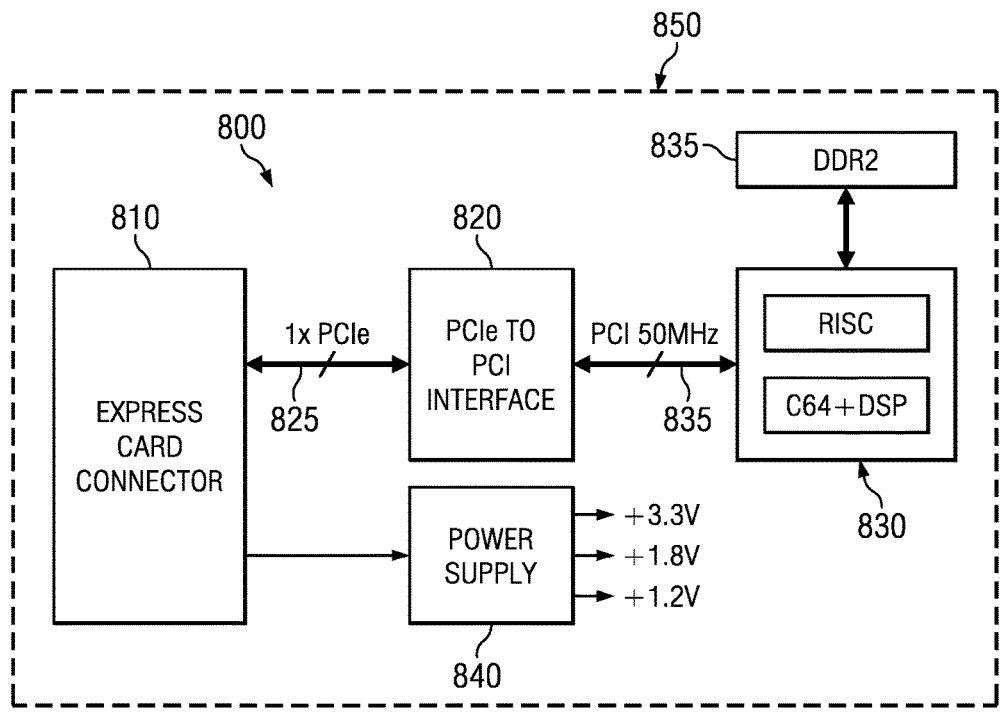
FIG. 8 is a block diagram of a card-based transmit embodiment providing dynamic selection of compressive lossy and lossless modes for processing video and graphics and using an integrated WLAN circuit of a personal computer (PC) to communicate with a WLAN access point (AP).

In FIG. 8, a transmit embodiment 800 is connected or connectable to a PC Express Card connector 810 and uses dynamically-selected compression/decompression modes according any of the process embodiments described herein. The Express Card connector 810 provides 1×PCIe bus 825 signaling to a PCIe-to-PCI interface 820 such as XIO2001 from Texas Instruments. PCI at 50 MHz communicates on a bus 835 between the interface 820 and a processor 830 such as the DM6467 that is supported by DDR2 memory 835. A power supply circuit 840 provides appropriate operating voltages for the various circuits using energy fed to it from the Express Card connector 810. Processor 830 executes the dynamically-selected compression/decompression modes according any of the process embodiments described herein. Processor 830 is physically enclosed inside a card connector assembly 850 and coupled along bus 835 via PCIe-to-PCI interface 820 to transfer compressed and decompressed video/graphics via the 1×PCIe bus 825, and beyond card connector assembly 850 upon plugging. Networking for processor 830 is supported by networking circuitry beyond the Express Card connector 810 and in a host processor system outside FIG. 8.

Figure 9:
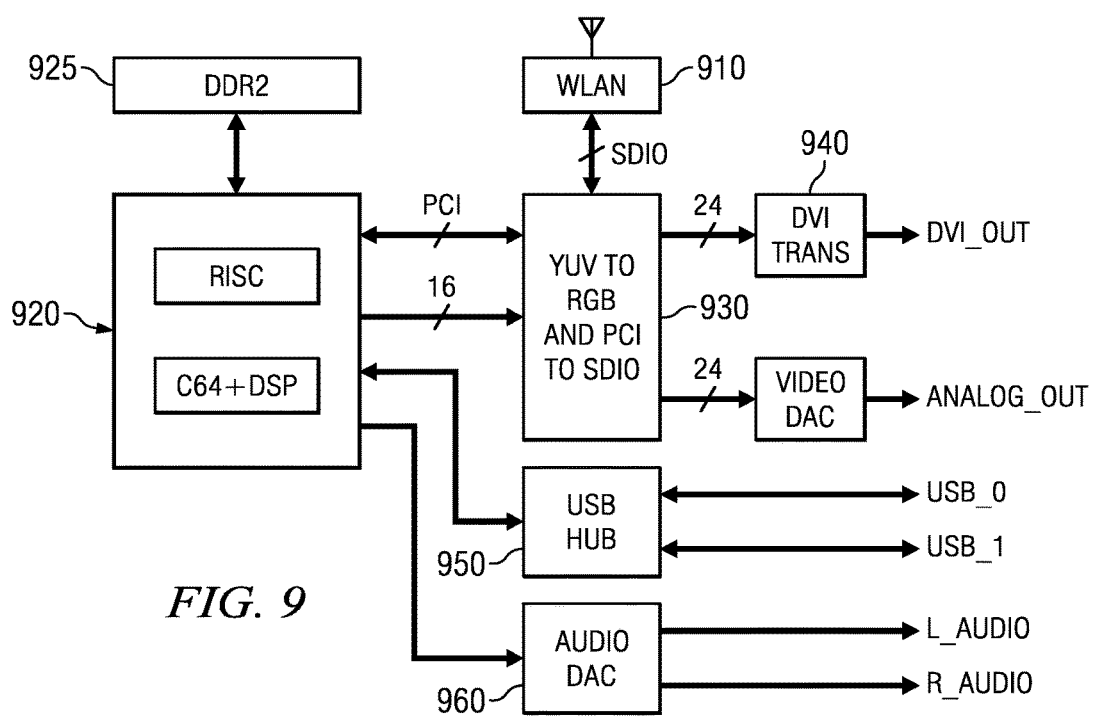
FIG. 9 is a block diagram of a receive architecture embodiment providing dynamic selection of compressive lossy and lossless modes for processing video and graphics and using a WLAN circuit to receive from a WLAN access point (AP).

In FIG. 9, an alternative embodiment for a wireless receive architecture can be compared with that of FIG. 3. In FIG. 9, a system embodiment 900 includes a WLAN PHY (physical layer) 910 with a serial SDIO interface, a main processing chip such as a SoC (system on chip) 920 with memory 925 such as one having a DDR2 interface, and an interface 930 providing YUV-to-RGB and PCI-to-SDIO interface functionalities. SoC 920 in one example has a RISC (reduced instruction set computing) processor core such as an ARM™ core, a DSP (digital signal processor) core, and a HDVICP as shown in FIGS. 12 and 13. A commercially-available DM6467 processor from Texas Instruments Inc., Dallas, Tex., or other suitable processing device is used for SoC 920. SoC 920 has a 16-bit YUV port that conveys video/graphics to interface 930. In turn, interface 930 provides separate 24-bit RGB buses to a DVI (digital visual interface) transmitter circuit 940 to output DVI_Out and/or a Video DAC to an output Analog_Out to an analog display monitor. USB Hub logic 950 interfaces SoC 920 with multiple USB connectors USB_0, USB_1, etc. such as to connect with a PC (personal computer). An audio DAC (digital to analog converter) 960 couples the SoC 920 to left and right stereo audio outputs L_Audio and R_Audio. A power supply circuit (not shown) supports this system embodiment.

In FIG. 10, a current Frame Fn to be encoded (such as by H.264) is fed from a Frame buffer to a summing first input of an upper summer that has a subtractive second input coupled to and fed from the selector of a switch that selects between predictions for Inter and Intra Macroblocks. This upper summer subtracts the applicable prediction from the current Frame to produce Residual Data (differential data) as its output. The Residual Data is compressible to a greater extent than non-differential data. The Residual Data is supplied to the Transform T, such as a discrete cosine transform (DCT), and then sent to Quantization Q. Quantization Q delivers quantized Residual Coefficients in macroblocks having 8×8 blocks, for instance, for processing by the Entropy Encode block and ultimately modulating for transmission by a modem. Encode in some video standards also has an order unit that orders macroblocks in other than raster scan order.

In FIG. 10, this video encoder has Motion Estimation (Motion_Est, ME), Motion Compensation MC, intra prediction, spatial Transform T, quantization Q and loop-filter such as for H.264 and AVS. The video encoder provides high performance and economy. An Entropy encoder block is fed by residual coefficient output data from quantization Q. The entropy encoder block reads the residual coefficient into a payload RBSP and provides start code and syntax elements of each NAL unit, and converts them into an output bit stream. During encoding, exp-golomb code and 2D-CAVLC (context adaptive VLC) or CABAC are applied for high performance, low latency, and real-estate and power economies. Feedback is provided by blocks for motion compensation MC, Intra Decision, Intra Prediction, inverse quantization IQ, inverse transform IT, a second summer (lower right) and a loop (deblocking) filter.

The Loop Filter, also called a Deblocking filter, smoothes artifacts created by the block and macroblock nature of the encoding process. The H.264 standard has a detailed decision matrix and corresponding filter operations for this Deblock filter process. The result is a reconstructed frame that becomes a next reference frame, and so on. The Loop Filter is coupled at its output to write into and store data in a Decoded Picture Buffer (F'n Reconstructed Frame in FIGS. 10-11). Data is read from the Decoded Picture Buffer into two blocks designated ME (Motion Estimation in FIG. 10) and MC (Motion Compensation in FIG. 11 as well as FIG. 10). The current Frame is fed to motion estimation ME at a second input thereof, and the ME block supplies a motion estimation output to a second input of block MC. The block MC outputs motion compensation data to the Inter input of the already-mentioned switch. In this way, the image encoder is implemented in hardware, or executed in hardware and software in a video codec block of the system, and efficiently compresses image Frames and entropy encodes the resulting Residual Coefficients using VLC (variable length coding).

In FIG. 10, a further remarkable block 1010 labeled Average of Motion Vector Magnitudes 1010 is coupled for input from the motion estimation ME block. Video/graphics input 105 from FIG. 1 goes as input to the motion estimation ME block even when the content is graphics and with all the other blocks in the encoder are inactivated for power management purposes. If motion is detected by FIG. 10 block 1010 for use at step 110 of FIG. 1, those other blocks of the FIG. 10 motion video encoder are activated according to step 130 of FIG. 1, step 230 of FIG. 2, or step 630 of FIG. 6, otherwise a lossless graphics encoder 120 is activated instead and provided with image data to be encoded.

FIG. 10 is further considered hereinbelow in connection with energy considerations. Let it first be noted, however, that in systems in which the encoding of FIG. 1 is only performed remotely, such as in a server, battery life is mostly inapplicable. Accordingly, the energy considerations in running the motion estimation ME of FIG. 10 for step 110 of FIG. 1 in addition to a lossless encoder 120 when the frame is all-graphics are not believed to represent a significant energy-consumption issue in a server. Because the decoder for a client device often does not need motion estimation ME, see FIG. 6A, implementing the encoding in a server remote from a client device is highly attractive not only for a personal computer PC but also for game stations, and for battery powered mobile devices such as handsets and tablets because of the video capability and increased graphics image quality.

Additionally, some further embodiments are contemplated for battery powered mobile devices such as handsets and tablets that include a video encoder for video content generation and transmission from the mobile device itself. Accordingly and with reference to FIGS. 1 and 10, to more specifically consider these embodiments from an energy viewpoint, discussion now turns more particularly to the topic of energy expenditure to generate motion vectors in FIG. 1 when the frame is all-graphics or when instead the process is handling the case of mode-switched graphics and a still scene. This FIG. 1 process is energy-efficient though it be generating motion vectors when all-graphics is determined in step 110, because the frame rate for motion estimation thereafter until video is detected in the future is at a slow, energy-efficient rate, e.g. 10 frames per second, slowed down to 10 Hz for graphics from a 30 Hz or 60 Hz rate video rate of a motion case but still fast enough during graphics to detect and switch back to video encode swiftly.

As much as 60-70% of the whole of a motion-based compression algorithm of FIG. 10 running at full video rate is likely to occupied by computations that can be powered off or omitted because they are unrelated to the motion estimation ME portion that is involved in a dynamic process of FIG. 1 (or FIG. 2, 2A or 6). (The percentage will vary across different video encoders and their implementations.) Moreover, with the motion estimation for FIG. 1 slowed down to 10 frames per second during graphics-only, the ME portion in FIG. 10 consumes even less power and energy when used to support step 110 (or 210 or 610). Furthermore, when the motion estimation ME pertains to a small image portion or small window in the frame, then ME consumes but a fraction of the power that would be consumed to ME-process a whole full-size frame. If ME therefore consumes 30-40% of video compression processing power at full video rate, then at the reduced rate of 10 Hz, the ME for step 110 in FIG. 1 is likely to consume about 10% or less of the power of video encode, and for a small window then even less yet. Also the lossless graphics compression 120 is likely to have economically-modest computational complexity and energy footprint. This modest energy footprint of slow-running ME for graphics origination in FIG. 1, 2, 2A or 6 is believed to be quite acceptable, especially since high performance including excellent quality of all types of images promotes the user experience of such a battery-powered full-featured mobile device which would itself likely be acquired and be being used for its encode quality and performance. Moreover, when motion video is present, the motion estimation ME is an integral part of the video compression process and thus represents no additional power or energy consumption since video encoding is already intended for such mobile device.

As discussed, various embodiments are thus made energy-efficient for a battery powered mobile device as well as other devices, even when generating motion vectors for FIG. 1 mode control in case of all-graphics or graphics and a still scene. Also in some embodiments, programmable smart control as in FIG. 2 further conserves energy by making the motion detection process run briefly when a graphics frame or window is opened and then deferring further motion detection until some new window is opened that might hold motion content.

Some embodiments can be provided to detect a link into a video clip, to detect the window opening event. A window can be opened by either the OS (operating system) or a application (app) running under the OS. Some embodiments need to be OS/app-independent (also called "OS-agnostic" in this art) and therefore avoid detection of particular apps as the OS launches them. Such OS independence facilitates graphics subsystem or card usage and proliferation into a wide variety of systems. In FIG. 2, the process embodiment checks at step 210 when any app (software application) is opened and delivers X,Y window coordinates to allocate a frame buffer. Only then does step 220 execute a motion estimation check, and thus the steps 210, 220 together power-efficiently operate the motion estimation ME infrequently.

Some embodiments can be categorized by OS-independence or non-independence: An embodiment Category 1 is OS-independent and has only motion estimation ME for video/graphics detection at steps 110, 220, 610, 620. A second embodiment Category 2 is less OS-independent so that steps like 110, 220, 610 may use OS and software app information as well as motion estimation ME as cues to de-activate ME and other modules when they are not necessary in power-at-a-premium devices and systems. In FIG. 2, an optional step 107 provides OS notification of user activity and identifies a particular app for step 220 to use in case of a Category 2 embodiment; and for a Category 1 embodiment step 107 may be omitted. For example, if a user has clicked on a desktop icon for an application that only delivers video or only delivers graphics, or has clicked on an app button that opens a video-only window or graphics-only window, then step 220 can branch to the respective step 130 or step 120 immediately in FIG. 2 without need of motion estimation sometimes.

In FIG. 11 lossy decompression, macroblocks of residual coefficients are inverse quantized in block IQ, and an inverse of the transform T is applied by block IT, such as an inverse discrete cosine transform (IDCT), thereby supplying the residual data as output. The residual data is applied to a FIG. 11 summer (analogous to lower summer of FIG. 10). Summer output is fed to an Intra Prediction block and also via the Loop Filter to a Decoded Picture Buffer. The Loop Filter, also called a Deblock filter, smoothes artifacts created by the block and macroblock nature of the encoding process. Motion Compensation block MC reads the Decoded Picture Buffer and provides output to the Inter input of a switch for selecting Inter or Intra. Intra Prediction block provides output to the Intra input of that switch. The selected Inter or Intra output is fed from the switch to a second summing input of the summer. In this way, an image frame is reconstituted by summing the Inter or Intra data plus the Residual Data. The result is a decoded or reconstructed frame for image display, and the decoded frame also becomes a next reference frame for motion compensation.

In FIG. 11, the video decoder is related to part of FIG. 10 and, compared to FIG. 10, FIG. 11 uses the feedback blocks, and omits the blocks Frame (current) and associated block Intra Prediction Mode Decision, and further omits Motion Estimation ME, upper summer, Transform T and Quantization Q. The video decoder embodiment of FIG. 11 provides both performance and economy. A modem receives a telecommunications signal and demodulates it into a bit stream. The entropy decoder block efficiently and swiftly processes the incoming bit stream and detects the incoming start code and reads the syntax elements of each NAL unit, and further reads the payload RBSP and converts it into residual coefficients and some information for syntax of the Macroblock header such as motion vector and Macroblock type. An exp-golomb decoder and 2D-CAVLC or CABAC decode are applied in the entropy decoder block. In accordance with some video standards, a reorder unit in the decoder may be provided to assemble macroblocks in raster scan order reversing any reordering that may have been introduced by an encoder-based reorder unit, if any be included in the encoder. Entropy Decoder control output is also coupled to MC and Intra_Prediction.

To support the entropy encode/decode in FIGS. 10-11, VLC (variable length coding) tables are implemented into encoder H/W storage in some versions. CAVLC (context adaptive variable length coding) of some video standards have numerous VLC tables. The entropy decoder core has four types of Exp-Golomb decoder, the VLC tables, VLC decoder and a Context Manager. Firstly, the Exp-Golomb decoder reads the bit stream payload and obtains symbol and consumed bit length. The bit length is sent to stream buffer and defines a pointer of the stream buffer for decoding a next symbol. The obtained symbol is sent to VLC decoder. In the entropy block, the macroblocks of residual coefficients are recovered, in e.g. 8×8 blocks, and are stored in a Residual Coefficient storage for transfer to the MC and Intra_Prediction of FIG. 11. Some background on processing residual coefficients is provided in US Patent Application Publication 20100290533 "Encoders, Decoders, Codecs and Systems and Processes for their Operation and Manufacture" dated Nov. 18, 2010, which is hereby incorporated herein by reference.

In FIG. 12, SoC processor blocks include an ARM® RISC processor for 300 MHz operation and its caches and local memories, a C64 DSP core for 600 MHz operation and its caches and local memories, a dedicated HDVIC area having two RISC processors (HDVICPs) for up to 300 MHz HDVIC video codec and lossless graphics codec processing, system memory, numerous peripherals, serial and parallel interfaces and video ports as shown, HPI interface, and a crossbar and switch fabric for coupling the various blocks in the SoC, and support circuitry such as PLLs, timers and debug circuitry. Other simpler or more complex processing arrangements with faster or slower processing rates and other performance parameters may be provided in alternative embodiments using the teachings from this example SoC and the other teachings herein.

In FIG. 13, a detail of a portion of the SoC of FIG. 12 emphasizes and includes the RISC processor, DSP core, the two HDVICPs for video codec and lossless graphics codec processing, system memory, and the crossbar bus and switch fabrics.

In FIG. 14, high resolution HD single display or dual display are supported by two channels in a server embodiment that has two processing blocks each having a RISC processor and a digital signal processor such as a C64xx DSP from Texas Instruments. Each such processing block is supported by a nonvolatile memory, such as DDR2 SDRAM. The architecture is highly scalable for two- or more multiple channels each having DVI receivers, RGB to YUV conversion, and parallel 1000BaseT PHYs on the system output.

In FIG. 15, another server embodiment includes a SoC with a RISC processor of very high performance (such as a Cortex™ or other high performance processor), a digital signal processor such as a C64xx DSP from Texas Instruments, a three-dimensional graphics unit 3D GFX, and a pair of HDVICP units. The architecture is highly scalable for multiple channels having DVI receivers providing RGB input to the SoC, and 1000BaseT PHY output to a network.

Figure 16:
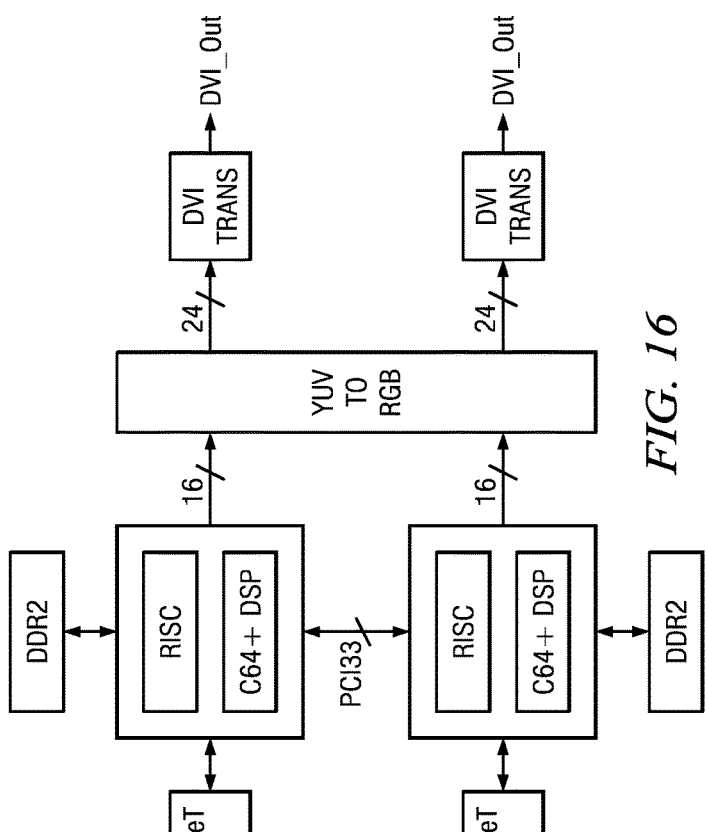
FIG. 16 is a block diagram of a client device embodiment operable to process video and graphics previously encoded using dynamic mode selection by process embodiments such as in any of FIGS. 1, 2, 2A and 6, and the client executing a decoding process such as in FIG. 6A.

In FIG. 16, a client embodiment has two processing blocks each having a RISC processor (e.g., ARM® 926 or other processor) and a digital signal processor such as a C64xx DSP from Texas Instruments. Each such processing block is supported by a nonvolatile memory, such as DDR2 SDRAM. The architecture is highly scalable for two- or more multiple channels each having DVI transmitters fed by YUV-to-RGB conversion. Parallel 1000BaseT PHYs provide system input channels.

Figure 17:
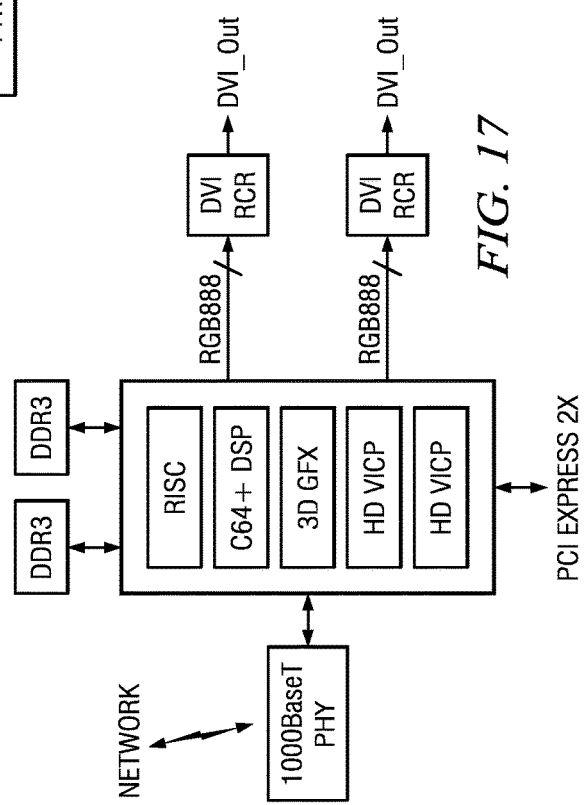
FIG. 17 is a block diagram of another client device embodiment operable to process video and graphics previously encoded using dynamic mode selection by process embodiments such as in any of FIGS. 1, 2, 2A and 6, and the client executing a decoding process such as in FIG. 6A.

In FIG. 17, another client embodiment includes a SoC with a RISC processor of very high performance (such as a Cortex™ or other high performance processor)), a digital signal processor such as a C64xx DSP from Texas Instruments, a three-dimensional graphics unit 3D GFX, and a pair of HDVICP units. The architecture is highly scalable for multiple channels having DVI receivers providing with RGB input from the SoC. The DVI receivers provide parallel outputs DVI_Out. 1000BaseT PHY couples to the SoC network communications.

Figure 18:
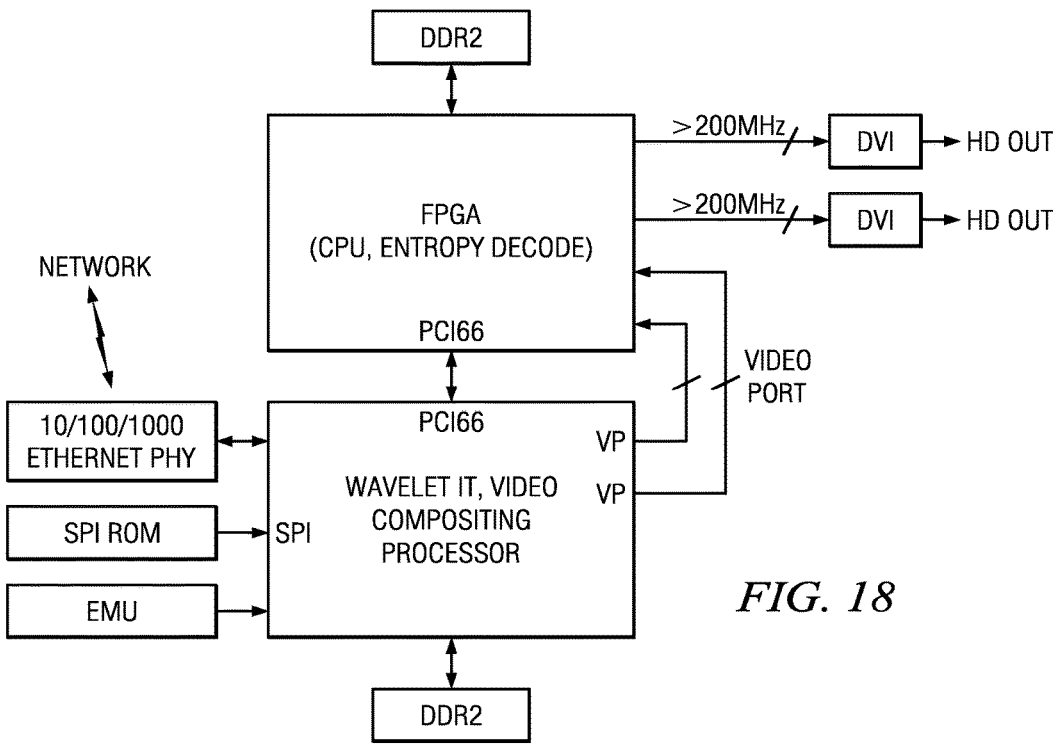
FIG. 18 is a block diagram of a wavelet-based HD (high-definition) image processing embodiment operable to decode-process (such as in the lossless block of FIG. 6A) video and graphics encoded as in FIG. 19 using dynamic mode selection by process embodiments such as in any of FIGS. 1, 2, 2A and 6.

In FIG. 18, a lossless wavelet-based HD (high-definition) decoder embodiment provides image processing up to 2560×1600 and greater resolutions. Lossy decompression 130, such as H.264, can be modularly separate from this FIG. 19 block in some embodiments or combined into it in some other embodiments and patterned either way after the teachings in the other Figures. An FPGA (field programmable gate array) or CPU executes entropy decode. A high-performance processor, such as DM6467 from Texas Instruments or other suitable processor, provides wavelet IT (image transform) and video compositing operations coupled by PCI66 and Video Port VP buses to the FPGA. A 10/100/1000 Ethernet PHY couples with a network and to the wavelet IT/compositing processor. Two DVI interfaces deliver HD Out (high definition) output from the FPGA. SPI (serial port interface), ROM (read only memory), DDR2 memory, and Emulation support this system. Both wavelet compression and decompression are suitably supported in some system embodiments, or provided in separate device embodiments as appropriate.

Figure 19:
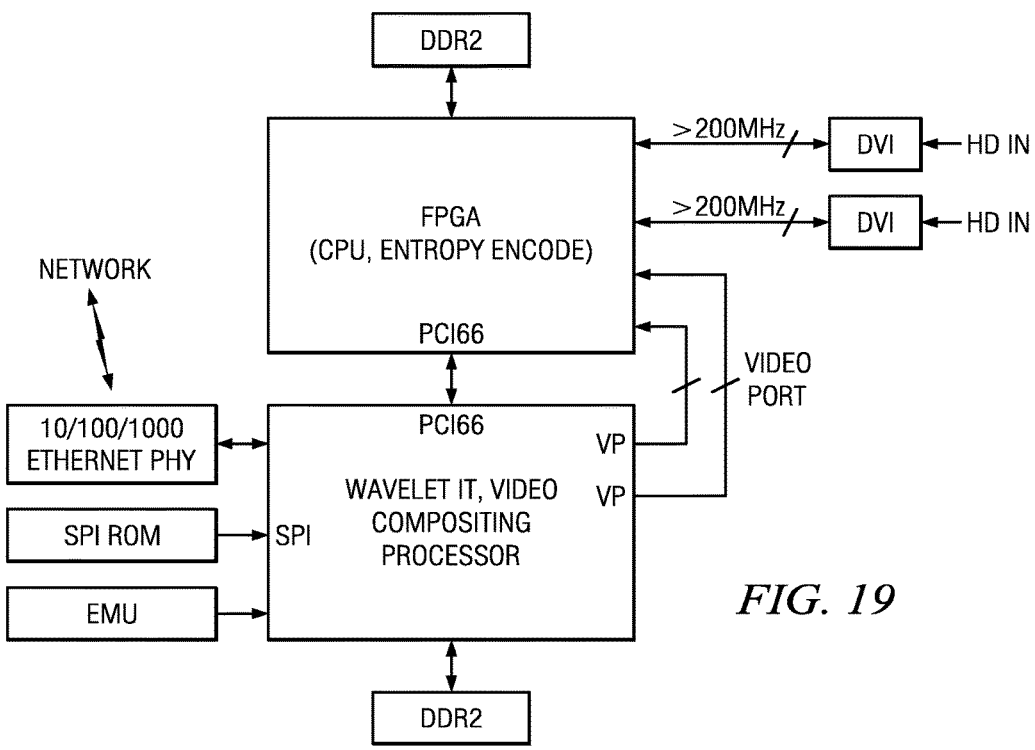
FIG. 19 is a block diagram of a wavelet-based HD (high-definition) image processing embodiment operable to encode-process video and graphics using dynamic mode selection by process embodiments such as in any of FIGS. 1, 2, 2A and 6.

In FIG. 19, a lossless wavelet-based HD (high-definition) encoder embodiment provides image processing up to 2560×1600 and greater resolution. On this encoding side, wavelet lossless compression modes are used to implement or substitute for the lossless compression module or step 120 in FIG. 1. Lossy compression 130, such as H.264, can be modularly separate from this FIG. 19 block in some embodiments or combined into it in some other embodiments and patterned either way after the teachings in the other Figures. The input/output image flow is reversed in FIG. 19 for encode compared to FIG. 18 for decode. Thus, two HD_In channels have DVI to FPGA. The FPGA (field programmable gate array) or CPU executes the entropy encode, and in some embodiments can be the same one as in FIG. 18 operated in an encoding mode. The FPGA couples image data via PCI66 to Wavelet IT/compositing processor, and processor output to the network via the Ethernet PHY. Another unit of high-performance processor, which can be the same one as in FIG. 18, provides wavelet IT (image transform) encoding and video compositing operations. Both wavelet compression and decompression are suitably supported in some system embodiments, or provided in separate device embodiments as appropriate.

Various embodiments are provided for image encoders, decoders, codecs, transcoders and other devices, processes, and systems to which their advantages commend their use. Particular clock rates, bandwidths, data rates, memory capacities, numbers of bits, power supply voltages, and other circuit, system and process parameters are illustrative and not limiting in interpretation.

In addition to inventive structures, devices, apparatus and systems, processes are represented and described using any and all of the block diagrams, logic diagrams, and flow diagrams herein. Block diagram blocks are used to represent both structures as understood by those of ordinary skill in the art as well as process steps and portions of process flows. Similarly, logic elements in the diagrams represent both electronic structures and process steps and portions of process flows. Flow diagram symbols herein represent process steps and portions of process flows in software and hardware embodiments as well as portions of structure in various embodiments of the invention.

ASPECTS (See Notes paragraph at end of this Aspects section.)

1A. The computing device claimed in claim 1 wherein said processor is operable to assemble and format the content from the diverse compressions into a stream as a combined video/graphics streaming content output.

1B. The computing device claimed in claim 1 wherein said processor is operable to assemble, format and write the content from the lossy compression and the lossless compression to a storage selected from the group consisting of 1) storage buffer, 2) a memory, 3) a flash drive, 4) a hard drive, 5) a digital video disk (DVD).

1C. The device claimed in claim 1 wherein said processor is operable to electronically determine whether a region of input content is video-only, and if video-only, then feeding the entire frame to the lossy compression; and if not video-only, then doing a macroblock-level classification to separate graphics content from video content, and selectively feeding each macroblock classified as graphics content to lossless compression, and feeding each macroblock classified as video content to lossy compression.

1D. The device claimed in claim 1 further comprising a modem operable to transmit compressed content delivered over time from the diverse compressions.

1E. The device claimed in claim 1 wherein the determining whether motion video is present includes comparing at least one threshold with a quantity based on motion vector magnitudes derived from each of various image portions in the image or frame by comparison with its most-nearly corresponding image portion, if any, in at least one prior image or frame.

1F. The device claimed in claim 1 further comprising a coprocessor responsive to said processor, said coprocessor operable to supply an average of motion vector magnitudes for an image region, and to compare the average with a threshold to produce a compression type-control.

1G. The device claimed in claim 1 wherein said processor is operable to electronically assemble and format the content from the lossless compression and the lossy compression into a stream as a combined video/graphics streaming content output.

1H. The device claimed in claim 1 wherein the electronic analysis by said processor includes comparing at least one threshold with a quantity selected from the group consisting of 1) average of magnitudes, 2) weighted average of magnitudes, 3) magnitude-sum, 4) count of motion vectors per frame having magnitudes exceeding a magnitude threshold.

1J. The device claimed in claim 1 wherein said processor is operable to detect motion in different parts of a frame and dynamically block-partition the frame itself based on each motion-image portion and motionless-image portion therein, and then activate each applicable set of instructions to lossy-compress and losslessy-compress the block partitions.

1K. The device claimed in claim 1 further comprising a modem operable to receive remotely-originated controls, and wherein said processor is coupled with said modem and responsive to the received remotely-originated controls to select particular such portions of said storage for the electronic analysis and for the compression of such portions according to the electronic analysis.

1K1. The computing device claimed in claim 1K wherein said processor is operable to combine the content from the diverse compressions as a combined video/graphics content output to said modem to transmit.

1L. The computing device claimed in claim 1 wherein said processor has a graphics driver and coordinate registers, and said processor is further operable to obtain a location of a graphics window by reading said coordinate registers from the graphics driver.

1M. The device claimed in claim 1 further comprising a display coupled with said processor and operable as a video-conferencing device.

1N. The computing device claimed in claim 1 wherein said processor has a video imaging co-processor to do the lossy compression and a digital signal processor to do the lossless compression, whereby enabling parallel video and graphics compression.

1P. The computing device claimed in claim 1 wherein said processor includes a reduced instruction set computing (RISC) core, a digital signal processor (DSP) core, and a high definition video imaging co-processor.

1Q. The device claimed in claim 1 further comprising at least two digital video DVI interfaces to receive high definition (HD) input, an entropy encoder coupled to said at least two DVI interfaces, an Ethernet physical layer coupled with said processor, and said processor operable for wavelet image transform-based lossless compression and video compositing, and coupled to said entropy encoder.

1R. The device claimed in claim 1 wherein said processor is configured with high priorities on input device triggers and write interrupts.

1S. The device claimed in claim 1 wherein said storage has the first set of instructions including at least some instructions for an H.264 image coder.

1T. The device claimed in claim 1 wherein said storage has the second set of instructions including at least some instructions for a JPEG image coder.

1U. The device claimed in claim 1 wherein said processor is operable to handle at least two images for the lossless compression selected from the group consisting of 1) still photo, 2) motionless macroblock, 3) graphics toolbar, 4) icon, 5) cursor, 6) game piece, 7) window outline, 8) menu, 9) radio button, 10) text box.

1V. The device claimed in claim 1 wherein said processor has a video port, and further comprising a peripheral interface coupled with the video port of said processor and selected from the group consisting of 1) digital visual interface (DVI), 2) display port (DP), and 3) USB Hub.

1W. The device claimed in claim 1 wherein said processor includes a RISC (reduced instruction computing) processor circuit, a three-dimensional graphics unit including a digital signal processor and at least two high definition video imaging co-processors, and a multiple channel digital visual interface coupled with said processor, and a networking modem coupled with said processor.

10A. The device claimed in claim 10 wherein said processor is operable, when a window-opening event occurs, to decide whether the new window and a frame have an identical type of content selected from the group consisting of 1) motion and 2) non-motion, and in that case further comprising activating the applicable set of instructions for compression correspondingly selected from the group consisting of 1) lossy and 2) lossless for the frame and window combination together.

11A. The process claimed in claim 11 wherein the combiner module is operable to assembling and formatting the content from the diverse compression processes into a stream as a combined video/graphics streaming content output.

11B. The process claimed in claim 11 wherein the transmitting includes associating metadata to the content from the diverse compression processes indicating a presence and absence of motion in the content.

11C. The process claimed in claim 11 wherein the performing includes assembling, formatting and writing the content from the diverse compression processes to a storage selected from the group consisting of 1) storage buffer, 2) a memory, 3) a flash drive, 4) a hard drive, 5) a digital video disk (DVD).

11D. The process claimed in claim 11 wherein the determining whether motion is present includes comparing at least one threshold with a quantity based on a per-window average of the motion magnitude information for different windows with different sizes for which a different number of motion vectors exists.

11D1. The process claimed in claim 11D wherein the determination whether motion is present is thereby resistant to false triggering due to noisy video.

The process claimed in claim 11 wherein the determining whether motion is present includes comparing a same threshold parameter value with a motion vector magnitude-average for each applicable window, image portion, and block, whereby the numbers of motion vectors of different image portions may vary at different times and different sources.

11F. The process claimed in claim 11 wherein the process is operating system independent and has only motion estimation for video/graphics detection.

11G. The process claimed in claim 11 further comprising a minimum-interval timer to avoid times between switching instances that are less than the minimum-interval.

11H. The process claimed in claim 11 wherein the process dynamically block partitions at the window boundary when a new window opens and a boundary crosses a block, so as to reparation a 32×64 block and then operate at a different frame rate.

11J. The process claimed in claim 11 wherein when a frame has graphics as well as motion video, the process losslessly compresses the graphics and concurrently applies a lossy compression process to the motion video, in parallel.

11K. The process claimed in claim 11 further comprising checking when a software application is opened and delivers window coordinates to allocate a frame buffer, whereupon only then executing a motion estimation check, whereby power-efficiently executing motion estimation less frequently.

11L. The process claimed in claim 11 wherein a graphical element may be moved, and further comprising identifying that element with a graphical type code and varying coordinates and performing the lossless encoding on the element according to the varying coordinates.

11M. The process claimed in claim 11 further comprising generating metadata as codes accompanying such transmitted content, the codes identifying locations and sizes and status as graphics or motion video.

11N. The process claimed in claim 11 wherein the executing includes re-using motion vector data generated by a motion estimation engine.

11P. The process claimed in claim 11 further comprising handling a window-closing event by sending disabling controls to terminate the applicable compressing process that is active on the window.

11P1. The process claimed in claim 11P further comprising maintaining a metadata storage table about usage of each type of compressing by loading and editing the storage table in response to window-opening and window-closing events to determine the type of compressing for such a window being closed relative to those that are still open so as to deactivate any type of the compressing that is no longer needed.

11P2. The process claimed in claim 11P further comprising terminating the lossless compressing only upon closing of a last remaining graphics window.

1P3. The process claimed in claim 11P further comprising terminating the lossy compressing only upon closing of a last remaining video window.

11Q. The process claimed in claim 11 further comprising obtaining a location of a window for such graphics by reading coordinate registers from a graphics driver.

14A. The process claimed in claim 14 wherein the executing and performing are done multiple times for multiple new window-opening events on the same screen.

14B. The process claimed in claim 14 for use with a program that supplies metadata identifying the size and position for each window block and metadata how decoder should ultimately reassemble any such blocks, the process wherein in case application operations specify a part of a screen currently showing graphics and load in a video into a new window, then said executing includes responding to the metadata that a new window is being opened by thereupon detecting presence or absence of motion in the new window specifically.

14C. The process claimed in claim 14 wherein the screen has motion video with the new window including a graphics inset, and activating lossless decompression for the graphics inset.

14D. The process claimed in claim 14 wherein the screen has a graphics inset selected from the group consisting of 1) still photo, 2) text, 3) graphical geometric shapes, and with the new window including motion video, and activating lossy decompression for the motion video.

15A. The process claimed in claim 15 wherein the screen and new window are of the same motion/non-motion type said compression for the screen and inset combination together includes loading up a frame buffer at a same type-specific rate and decompressing the whole screen with the new window together.

15B. The process claimed in claim 15 wherein the screen and the new window have a opposite type of content selected from the group consisting of 1) motion and 2) non-motion, and further comprising loading up portions of a frame buffer with frame content and content from each inset window and executing respective decodings for motion and non-motion out of the corresponding portions of the frame buffer.

15C. The process claimed in claim 15 wherein the detecting a window-opening event includes detecting a link into a video clip.

15D. The process claimed in claim 15 wherein the process includes detecting at least one control signal selected from the group consisting of 1) mouse click signal and 2) app button-push signal that indicates activation of an application or window for video-only or graphics-only, and then branching to the respective lossy or lossless type of compression immediately, whereby avoiding some motion estimation instances.

16A. The process claimed in claim 16 further comprising a hysteresis-based process that utilizes a pair of thresholds Th1 and Th2 compared with a varying average magnitude of motion vectors in the image, whereby to handle noisy switchover points.

21A. The processor claimed in claim 21 further comprising a modem operable to receive remotely-originated compressed video/graphics content, said modem coupled to said video/graphics input circuit.

21A1. The processor claimed in claim 21A wherein said processor is operable to supply controls to said modem to transmit the controls, the controls representing a request for particular such video/graphics content to be remotely-originated.

21A2. The processor claimed in claim 21A wherein said modem has a wireless receive channel to receive remotely-originated compressed video/graphics content, and said processor is operable to supply controls to said modem to transmit command signals responsive to the controls via a separate, dedicated wireless backchannel, the command signals pertaining to such video/graphics content to be remotely-originated.

21B. The processor claimed in claim 21 wherein said first decompression module is operable to decompress video regions at thirty (30) frames per second, and said second decompression module is operable to decompress graphics regions at about ten (10) Hertz.

21C. The processor claimed in claim 21 wherein said combiner module is operable to overlay the decompressed graphics regions and the decompressed video regions to form a video/graphics output.

21D. The processor claimed in claim 21 further comprising a storage module accessible by said input circuit selected from the group consisting of 1) storage buffer, 2) a memory, 3) a flash drive, 4) a hard drive, 5) a digital video disk (DVD); and wherein said input circuit includes a circuit operable to access the content from said storage.

21E. The processor claimed in claim 21 further comprising a signage display fed by said processor, and said processor operable to display both the decompressed video and the decompressed graphics on said signage display.

21F. The processor claimed in claim 21 further comprising a projector fed by said processor, and said processor operable to display both the decompressed video and the decompressed graphics on said projector.

21G. The processor claimed in claim 21 wherein said combiner module is operable to electronically combine on a macroblock level any macroblocks from the lossless decompression and any macroblocks in the same frame from the lossy decompression as decompressed video content for display output.

21H. The processor claimed in claim 21 further comprising an entropy decoder and at least two digital video DVI interfaces coupled to said video/graphics input circuit to deliver high definition (HD) output from said entropy decoder, an Ethernet physical layer coupled with said combiner module, and said first decompression module operable for wavelet image transform-based lossless decompression.

21J. The processor claimed in claim 21 further comprising a wireless local area network physical layer with a serial SDIO interface; a RISC (reduced instruction set computing) processor core, a DSP (digital signal processor) core for said first decompression module, and a high definition video imaging co-processor for said second decompression module.

21J1. The processor claimed in claim 21J further comprising a YUV port for the compression modules, and an interface coupled to said YUV port and the interface including YUV-to-RGB and PCI-to-the-SDIO, and a digital visual interface DVI coupled to a first RGB part of said interface, and a video DAC coupled to a second RGB part of said interface.

21K. The processor claimed in claim 21 further comprising a KVM circuit coupled with said input circuit and with said combiner module, said KVM circuit selected from the group consisting of 1) KVM extender, 2) KVM switch.

21L. The processor claimed in claim 21 wherein said determination module and said first decompression module are together operable to handle at least two images for the lossless decompression selected from the group consisting of 1) still photo, 2) motionless macroblock, 3) graphics toolbar, 4) icon, 5) cursor, 6) game piece, 7) window outline, 8) menu, 9) radio button, 10) text box.

21M. The processor claimed in claim 21 wherein said combiner module is responsive to locally-originated data to combine a corresponding graphics inset with decompressed video/graphics of remotely-originated content when such is received via said video/graphics input circuit.

21P. The processor claimed in claim 21 wherein said video/graphics input circuit is operable to receive already-rendered frames of remotely-originated content, whereby the processor forms a thin client.

22A. The processor claimed in claim 22 wherein said combiner module is operable to respond to the metadata to reassemble image information from a frame and any insets to constitute a current screen output.

28A. The process claimed in claim 28 wherein said determination module is also operable to deactivate the lossless decompression only upon closing of a last remaining graphics window.

28B. The process claimed in claim 28 wherein said determination module is also operable to deactivate the lossy decompression only upon closing of a last remaining video window.

31A. The process claimed in claim 31 wherein the inputting also includes accessing the content from a storage selected from the group consisting of 1) storage buffer, 2) a memory, 3) a flash drive, 4) a hard drive, 5) a digital video disk (DVD).

31B. The process claimed in claim 31 wherein said decompression for the frame and inset combination together includes loading up a frame buffer at a same type-specific rate and decompressing the combination from the frame buffer together.

31C. The process claimed in claim 31 wherein the metadata is decoded to identify image portions by type, locations and sizes of graphics and motion video, and the determining includes parsing the mixed stream by motion/non-motion types and doing decompressions of the motion video and graphics information according to their respective types.

31D. The process claimed in claim 31 wherein the determining from the metadata includes detecting and responding to codes in the metadata identifying frame locations and sizes and status as graphics or motion video 31E. The process claimed in claim 31 wherein the metadata for a graphical element has varying coordinates, and the determining includes identifying that element as graphical and decompressing the element losslessly and doing the combining according to the varying coordinates.

31F. The process claimed in claim 31 further comprising responding to codes in the metadata identifying status of an inset as graphics or motion video and location and size of the inset in a frame, and the routing sends any compressed video and differently-compressed graphics to their respective types of decoding.

31G. The process claimed in claim 31 further comprising handling a window-closing by terminating the decompression applicable to the window.

31G1. The process claimed in claim 31G further comprising maintaining a metadata storage table for information about usage of each such decompression, and loading and editing the storage table in response to window-opening and window-closing so as to deactivate whichever one of the decompressions is not currently needed.

31G2. The process claimed in claim 31G further comprising deactivating the lossless decompression only upon closing of a last remaining graphics window.

31G3. The process claimed in claim 31G further comprising deactivating the lossy decompression only upon closing of a last remaining video window.

31H. The process claimed in claim 31 wherein the process supports a frame rate for display and the decisions in the decision tree are periodically operated to accommodate the frame rate.

39A. The peripheral device claimed in claim 39 for use with a modem controllable by controls via said card connector assembly, wherein said processor is further operable to generate the controls on said second bus.

Notes about Aspects above: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Processing circuitry comprehends digital, analog and mixed signal (digital/analog) integrated circuits, ASIC circuits, PALs, PLAs, FPGAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable. Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention may be made. The terms including, having, has, with, or variants thereof are used in the detailed description and/or the claims to denote nonexhaustive inclusion in a manner similar to the term comprising. The appended claims and their equivalents are intended to cover any such embodiments or modifications as lie within the scope of the invention.

What is claimed is:

1. A computing device comprising:
    a storage that over time is operable to include video and graphics content, and said storage includes a first set of instructions representing lossy video compression and a second set of instructions representing lossless compression; and
    a processor coupled with said storage, and said processor operable to electronically analyze at least a portion of the content for motion video based on magnitudes of motion vectors and, on detection of a significant amount of motion, further operable to activate the first set of instructions to compress at least the motion video, and otherwise to activate the second set of instructions representing lossless compression to compress at least the graphics, wherein at least one portion of the video and graphics content is compressed using lossless compression and at least another portion of the video and graphics content is compressed using lossy compression and wherein the portions are losslessly compressed or lossy compressed based on the amount of motion.

2. The computing device claimed in claim 1 wherein said processor is operable to electronically analyze the storage for motion based on exceeding a predetermined threshold by a sum of magnitudes of motion vectors in an image portion.

3. The computing device claimed in claim 1 wherein said processor is operable to electronically analyze the storage for motion based on detecting and counting multiple motion vectors per frame having magnitudes exceeding a magnitude threshold, and then determining whether or not the count exceeds a count threshold in order to mode-switch to lossy compression or decompression for delivering output.

4. The computing device claimed in claim 1 wherein said storage has at least one computer application and a user-openable window-based process, and said processor is further operable to execute such electronic analysis every time a window is opened to execute such computer application.

5. The computing device claimed in claim 1 wherein the first set of instructions further including instructions representing lossy video decompression and the second set of instructions further including instructions representing lossless decompression.

6. The device claimed in claim 1 wherein said processor is operable to electronically combine the compressed results of the lossless compression and of the lossy compression to supply as output compressed video and graphics and metadata identifying them.

7. The device claimed in claim 1 wherein the metadata indicate a presence and absence of motion in the content from such electronic analysis by said processor.

8. The device claimed in claim 1 wherein said processor has a portion to do the electronic motion-analysis to determine whether motion is substantially absent and then activate the lossy compression if significant motion is detected instead.

9. The device claimed in claim 1 wherein said processor is operable to electronically detect whether an additional new window is being opened on a screen and when a window-opening event occurs, then to selectively activate the first and second sets of instructions based on motion presence and absence pertaining to that new window.

10. The device claimed in claim 1 wherein said processor is responsive to a window-closing event to deactivate the applicable set of instructions that is active on the window.

11. A hybrid video/graphics process comprising:
    inputting compressed video/graphics content;
    executing a motion-vector-based test that determines whether motion video is present in a current input image selected from the group consisting of 1) window, 2) screen portion, 3) field, 4) frame, to a sufficient degree to be treated as motion;
    when motion video is substantially absent, then performing lossless compression process on the applicable content, and when motion is determined to be present, then performing a compression process adapted for motion content, wherein at least one portion of the inputted video content is compressed using lossless compression and at least another portion of the inputted video content is compressed using lossy compression and wherein the portions are losslessly compressed or lossy compressed based on the amount of motion; and transmitting the content delivered over time from the diverse compression processes.

12. The process claimed in claim 11 wherein the executing also includes electronically determining whether a frame of input content is video-only, and if video-only, then feeding the entire frame to the lossy compression; and if not video-only, then doing a macroblock-level classification to separate graphics content from video content, and selectively feeding each macroblock classified as graphics content to lossless compression, and feeding each macroblock classified as video content to lossy compression.

13. The process claimed in claim 11 wherein the executing further includes combining the compressed results of the lossless compression and of the lossy compression to supply as output compressed video and graphics and metadata identifying them.

14. The process claimed in claim 11 further comprising determining whether an additional new window is being opened on a screen and when a window-opening event occurs, then also doing said executing and performing in response to motion presence and absence pertaining to that new window.

15. The process claimed in claim 11 further comprising deciding whether an additional new window is being opened on a screen and when a window-opening event occurs, then also deciding whether the screen and the new window have an identical type of content selected from the group consisting of 1) motion and 2) non-motion, and in that case further comprising activating compression correspondingly selected from the group consisting of 1) lossy and 2) lossless for the frame and inset combination together.

16. The process claimed in claim 11 wherein the determining whether motion video is present includes comparing at least one threshold with a quantity based on motion vector magnitudes derived from each of various image portions in the image or frame by comparison with its most-nearly corresponding image portion, if any, in at least one prior image or frame.

17. The process claimed in claim 11 wherein the determining whether motion is present includes comparing at least one threshold with a quantity selected from the group consisting of 1) average of magnitudes, 2) weighted average of magnitudes, 3) magnitude-sum, 4) count of motion vectors per frame having magnitudes exceeding a magnitude threshold.

18. The process claimed in claim 11 further comprising operating only a portion out of a lossy compression module including a motion detector to do the test to determine whether a content is motionless and then activating more of the lossy compression module to perform the lossy compression if the content has substantial motion instead.

19. The process claimed in claim 11 wherein the process includes detecting motion in different portions of a frame and dynamically block-partitioning the frame itself based on each motion-image portion and motionless-image portion therein, and then lossy-compresses and losslessy-compresses each block thus established respectively.

20. The process claimed in claim 11 further comprising activating the motion detection when a new window is opened and then deferring further motion detection until some new window is opened that might hold motion content, whereby conserving energy.

* * * * *